(12) United States Patent
Wittenbreder, Jr.

(10) Patent No.: US 7,606,051 B1
(45) Date of Patent: Oct. 20, 2009

(54) FULLY CLAMPED COUPLED INDUCTORS IN POWER CONVERSION CIRCUITS

(76) Inventor: Ernest Henry Wittenbreder, Jr., 3260 S. Gillenwater Dr., Flagstaff, AZ (US) 86001-8946

(*) Notice: Subject to any disclaimer, the term of this patent is extended or adjusted under 35 U.S.C. 154(b) by 321 days.

(21) Appl. No.: 11/555,759

(22) Filed: Nov. 2, 2006

Related U.S. Application Data

(60) Provisional application No. 60/733,387, filed on Nov. 3, 2005.

(51) Int. Cl.
*H02J 1/02* (2006.01)
*H02M 3/335* (2006.01)

(52) U.S. Cl. ............... 363/39; 363/21.04; 363/21.12

(58) Field of Classification Search ............ 363/16, 363/20, 21.01, 21.04, 21.1, 21.12, 21.18, 363/56.09, 56.11, 97, 131, 39, 40
See application file for complete search history.

(56) References Cited

U.S. PATENT DOCUMENTS

| | | | |
|---|---|---|---|
| 4,441,146 A | | 4/1984 | Vinciarelli |
| 5,402,329 A | | 3/1995 | Wittenbreder |
| 5,886,881 A | * | 3/1999 | Xia et al. ............ 363/21.06 |
| 6,061,255 A | * | 5/2000 | Chik et al. ........... 363/21.06 |
| 6,272,023 B1 | | 8/2001 | Wittenbreder |
| 6,462,963 B1 | | 10/2002 | Wittenbreder |
| 6,512,352 B2 | * | 1/2003 | Qian ..................... 323/282 |
| 6,856,522 B1 | * | 2/2005 | Wittenbreder, Jr. ..... 363/21.01 |
| 7,196,913 B2 | * | 3/2007 | Tsuruya et al. ........ 363/21.06 |

OTHER PUBLICATIONS

Wittenbreder, Ernest H., "A Simple Clamped ZVS PWM Converter", APEC 93 Proceedings, p. 715.
Watson, R., Hua, G.C., Lee, F., "Characterization of an Active Clamp Flyback Topology for Power Factor Correction Applications", APEC 94, p. 412.

* cited by examiner

*Primary Examiner*—Gary L Laxton

(57) ABSTRACT

The subject invention reveals improvement methods for circuits that use a coupled inductor wherein overshoot and ringing associated with leakage inductance of said coupled inductor is entirely eliminated by addition of non-dissipative active clamp networks that clamp each winding during each operating state of a power supply containing said coupled inductor. A further improvement applicable to zero voltage switching circuits that employ an inductor for driving a zero voltage turn on switching transition of a switch enables elimination of said inductor and preserves said zero voltage switching properties by adding leakage inductance to a coupled inductor without any adverse overshoot and ringing effects associated with said leakage inductance. The subject invention also reveals a coupled inductor with enhanced leakage inductance which can be used with said other improvements. Example circuits including zero voltage switching flyback and forward converters which require only one magnetic circuit element are revealed. Zero voltage switching tapped inductor buck and boost converters with a single magnetic circuit element are also revealed.

20 Claims, 46 Drawing Sheets

On State (D)
No ringing. All four terminals are clamped.

Off State (1-D)
No ringing. All four terminals are clamped.

No ringing. All four terminals are clamped in both operational states.

(a)

(b)

FULLY CLAMPED COUPLED INDUCTORS IN POWER CONVERSION CIRCUITS

CROSS REFERENCE TO RELATED APPLICATIONS

This application claims the benefit of PPA Ser. No. 60/733,387, filed 2005 Nov. 3 by the present inventor.

BACKGROUND OF THE INVENTION

1. Field of the Invention

The subject invention generally pertains to electronic power conversion circuits, and, more specifically, to high frequency, switched mode electronic power converters. The subject matter relates to improvement methods to achieve a reduction in the number of magnetic circuit elements in known power converters, reduction of electromagnetic interference (emi), and achievement of power converters with reduced size and cost.

2. Description of Related Art

In modern commercial power electronic circuits coupled magnetic circuit elements in the form of coupled inductors and transformers play a very basic role in converting power from one voltage to a different voltage. In many cases coupled magnetic circuit elements provide the galvanic isolation necessary for personal safety. Every coupled magnetic circuit elements has, inherent to it, a component of coupled or mutual inductance corresponding to shared magnetic flux between a pair of windings and a component of uncoupled or leakage inductance corresponding to magnetic flux generated by currents in a winding that is not shared by or coupled to the other winding. This situation is illustrated in FIG. 1(a) wherein some of the flux generated by winding 1 is coupled to winding 2 and some of the flux generated by winding 1 is not coupled to winding 2. FIG. 1(b) illustrates a circuit model of a coupled magnetic circuit element that places a "leakage inductor" in series with the primary winding. There are other workable models for coupled magnetic circuit elements that work about as well as the model illustrated in FIG. 1(b) and yield equivalent performance results. A circuit model that places a "leakage inductor" in series with the secondary winding instead of the primary winding or a circuit model that places "leakage inductors" in series with both primary and secondary windings yields results with no significant difference from the FIG. 1(b) model. The uncoupled or leakage inductance contributes to the self inductance of each winding but exists independently of the mutual inductance. The leakage inductance is to a large extent a controllable quantity, but it can never be entirely eliminated. In some cases leakage inductance has a beneficial effect. The cases in which leakage inductance provides a benefit are generally those cases in which the circuit is workable with no magnetic coupling. For all the cases in which the circuit cannot function without magnetic coupling, leakage inductance is, generally, a detriment. There are circuits that are unworkable without magnetic coupling which have been proposed in which the leakage inductance is claimed as a benefit because the leakage inductance is used to drive a zero voltage transition of a switch in the power converter circuit thereby reducing or eliminating first order switching losses and improving converter efficiency, but most, if not all, of these circuits ignore and seem unaware of the emi issues related to leakage inductance. In the circuits that rely on leakage inductance for an efficiency benefit the leakage inductance must be significantly increased to fully realize the benefit claimed, but increasing the leakage inductance in these circuits generally increases overshoot and ringing, which is related to the interaction of the leakage inductance and the circuit's capacitive parasitic circuit elements. In general, increasing the leakage inductance in circuits that are unworkable without mutual inductance creates an overall detrimental effect. The applicant is not aware of any practical commercial circuits that have used leakage inductance to achieve higher efficiency. The commercially practical circuits that, to date, achieve effective elimination of switching losses rely on a separate discrete inductor to provide energy to drive a zero voltage transition of a switch. These commercially practical circuits also contain a clamp diode to clamp ringing associated with the discrete inductor. An example of such a circuit is illustrated in FIG. 17. Since the leakage inductance does not have independently accessible terminals, a clamp diode cannot be readily provided to clamp ringing associated with the leakage inductance. The fact that the leakage inductance terminals are not fully accessible is one of the main reasons arguing in favor of using a discrete inductor rather than leakage inductance as the energy storage mechanism needed to drive a zero voltage transition. FIG. 2 illustrates a flyback converter that incorporates a primary side dissipative clamp and a secondary side snubber to deal with the potential ringing and overshoot problems created by leakage inductance. The circuits provided to deal with the leakage inductance are generally dissipative, but non-dissipative clamps and snubbers exist and can be used to eliminate emi. The non-dissipative clamps generally require a capacitor, a switch, and a drive circuit with control logic for the switch. The non-dissipative clamp circuits are now commercially practical because of the declining costs of semiconductor solutions and they are now in relatively wide use. Non-dissipative snubbers are not in wide use because they generally require additional costly magnetic circuit elements and they can be complex.

FIG. 3 provides an example of a circuit implementation that fails to fully solve the emi problem related to leakage inductance. The circuit is an active clamp flyback converter. The active clamp circuit is comprised of $S_{PRICLAMP}$ and $C_{PRICLAMP}$. During an on state of the circuit, switch $S_{PRIMAIN}$ is in a conducting state (on) and switches $S_{PRICLAMP}$ and $D_{SECMAIN}$ are non-conducting (off). During the on state three of the four terminals of $T_{MAIN}$ are clamped to ac ground points in the circuit. The term ac ground is understood by those skilled in the art of power conversion to mean a circuit node wherein the voltage is invariant due to a direct connection to a ground or an indirect connection to a ground through a relatively large value capacitor or source of electromotive force (emf). At the power converter circuit's operating frequency the impedance of a relatively large value capacitor will appear as a short circuit. In the on state the primary winding is clamped, but the secondary winding is not clamped. During the on state of the FIG. 3 circuit, illustrated in FIG. 4, only terminal 3 of $T_{MAIN}$ has the potential to ring. Only terminal 3 of $T_{MAIN}$ is not clamped to an ac ground during the on state. Terminal 3, during the on state, is connected to a relatively small value capacitor associated with $D_{SECMAIN}$ that has the potential to oscillate and exchange energy with the leakage inductance through the mutual inductance of $T_{MAIN}$. In actual practice, ringing and overshoot occurs at terminal 3 of $T_{MAIN}$, creating an overvoltage stress and potential failure problem for $D_{SECMAIN}$ and an electromagnetic compatibility (emc) problem due to ringing at terminal 3 of $T_{MAIN}$. The voltage and current wave forms associated with the FIG. 3 circuit are illustrated in FIGS. 6(a) through 6(g). During the off state of the FIG. 3 circuit, illustrated in FIG. 5, all four terminals of $T_{MAIN}$ are clamped to ac grounds. Both the primary winding and the secondary windings of $T_{MAIN}$ are clamped during the off state of the FIG. 3 circuit. Terminal 1 is connected to the positive terminal of $C_{IN}$ and to $V_{IN}$ in both operating states, so no voltage ringing can occur at terminal 1. Terminal 2 is clamped during the off state through $S_{PRICLAMP}$ to $C_{PRICLAMP}$ and through $C_{PRICLAMP}$ to $V_{IN}$. In reality the leakage inductance energy rings with $C_{PRICLAMP}$ during the off state, but the ringing frequency, because of the large value of $C_{PRICLAMP}$ is very low, generally, much lower than the operating frequency of the power supply. The low frequency ringing associated with $C_{PRICLAMP}$ and the leakage inductance is also of very low amplitude. There are no adverse consequences to this low frequency ringing, so we shall ignore it, understanding that clamping leakage inductance energy through a large value capacitor eliminates adverse ringing, but allows a low frequency low amplitude ringing that has no adverse consequences. Terminal 3 is clamped to the secondary ground through $D_{SECMAIN}$ and terminal 4 is connected through $C_{OUT}$ to the secondary ground. Since all four terminals of $T_{MAIN}$ are clamped during the off state, none of the four terminals can ring and, in fact, none of the terminals ring during the off state of the FIG. 3 circuit, although the leakage inductance energy is greatest at the onset of the off state. The point for the reader to remember is that no adverse ringing due to leakage inductance energy occurs when all four terminals of $T_{MAIN}$ are clamped. Whether the terminals of a winding are connected to ac grounds or not, a winding will not ring adversely if one terminal of the winding is connected through a low impedance conducting path to a relatively large value capacitor and the other terminal of the same winding is connected through a low impedance conducting path to the opposite terminal of the same capacitor. The connection of a capacitor across the winding forces the winding voltage to remain substantially invariant, which is what is meant when we say that the winding is clamped.

In the FIG. 2 primary circuit a dissipative clamp is provided consisting of $D_{CLAMP}$, $C_{CLAMP}$, and $R_{CLAMP}$. At the beginning of the off state of the FIG. 2 circuit, leakage inductance energy is transferred through $D_{CLAMP}$ to $C_{CLAMP}$ and then the energy is dissipated in $R_{CLAMP}$ while discharging $C_{CLAMP}$. In the FIG. 3 circuit the dissipative primary clamp of FIG. 2 is replaced by the active clamp comprising $S_{PRICLAMP}$ and $C_{PRICLAMP}$. In the active clamp circuit energy from the leakage inductance is transferred to $C_{PRICLAMP}$ and then transferred back to the leakage inductance, where the energy can be used to drive a zero voltage turn on transition of $S_{PRIMAIN}$. If there is insufficient energy in the leakage inductance to drive $S_{PRIMAIN}$ to zero volts, then the leakage inductance energy is useful for at least reducing the turn on switching losses of $S_{PRIMAIN}$. If there is more than enough energy in the leakage inductance to fully drive $S_{PRIMAIN}$ to zero volts during the turn on transition of $S_{PRIMAIN}$, then the excess energy, energy remaining after the zero voltage turn on transition is complete, is transferred to the secondary circuit and the load. In summary, the active clamp circuit is non-dissipative and provides an obvious benefit in terms of reduced switching losses in addition to its benefit of prevention of adverse ringing at terminal 2 of $T_{MAIN}$.

What is needed is a way to eliminate emi associated with leakage inductance so that the leakage inductance can be used as a source of energy for zero voltage switching and improved efficiency.

OBJECTS AND ADVANTAGES

An object of the subject invention is to reveal a methodology for improving the electromagnetic compatibility of power converter circuits.

Another object of the subject invention is to reveal a methodology to reduce the size and cost of power converter circuits by making use of parasitic circuit elements that previously provided only a liability.

Another object of the subject invention is to reveal practical new power conversion circuits with lower component counts, higher efficiency, and reduced size and cost.

Further objects and advantages of my invention will become apparent from a consideration of the drawings and ensuing description.

These and other objects of the invention are provided by novel circuit techniques that eliminate overshoot and ringing associated with leakage inductance and utilize leakage inductance energy to reduce or eliminate first order switching losses in a power conversion circuit.

BRIEF DESCRIPTION OF THE DRAWINGS

The present invention is illustrated by reference to the drawings.

FIG. 6(f) illustrates the voltage wave form of the clamp capacitor of the FIG. 3 circuit.

SUMMARY

The subject invention teaches how leakage inductance can be fully tamed and used as a benefit in a wide variety of known power conversion circuits. By relying on the leakage inductance of a coupled inductor rather than a separate and distinct discrete series inductor, size and cost reductions can be realized. The key to enabling the beneficial use of the leakage inductance lies in the ability to eliminate the overshoot and ringing caused by leakage inductance in power converters of the prior art. The subject invention teaches how leakage inductance overshoot and ringing effects can be totally eliminated by applying an active clamp network or active clamp networks so that each winding of the coupled magnetic circuit element that contains the leakage inductance is fully clamped during every operating state of the power converter. In most power conversion circuits only one or two active clamp networks need to be added to fully clamp the coupled magnetic circuit element. The subject invention also teaches the implementation of a coupled inductor with a relatively large amount of leakage inductance which can be practically used as a benefit to drive a zero voltage turn on transition of a switch in a fully clamped power supply circuit as revealed in this invention.

DESCRIPTION OF THE PREFERRED EMBODIMENTS

Figure 3:
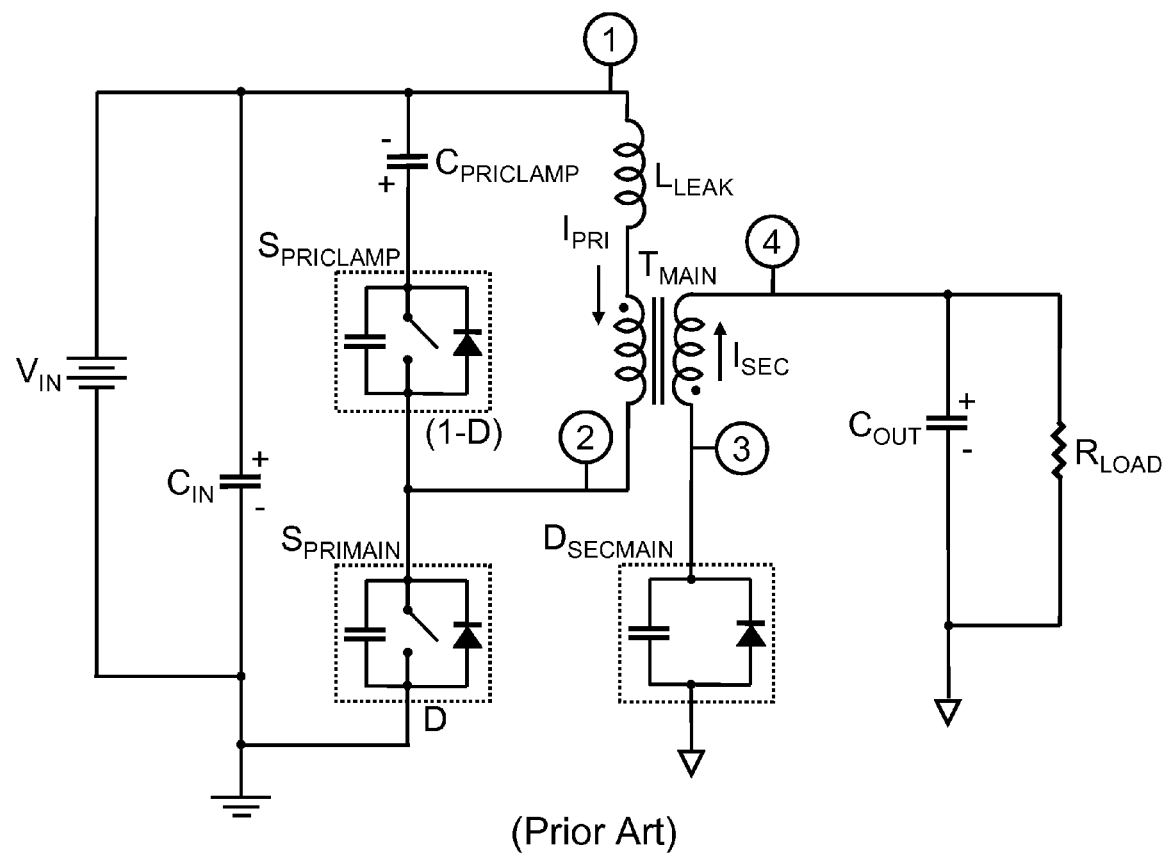
FIG. 3 illustrates a flyback converter with a primary active clamp circuit for eliminating overshoot and ringing associated with the leakage inductance during the off state of the flyback converter.
Figure 4:
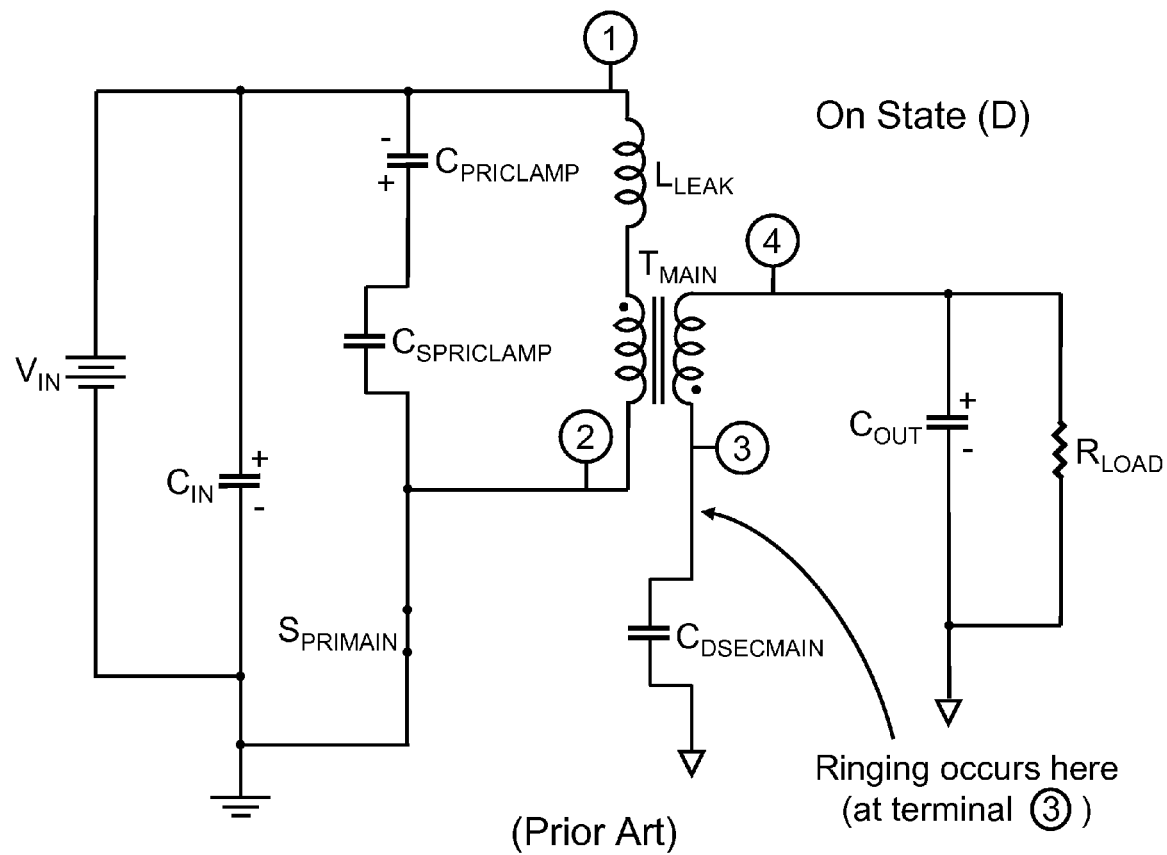
FIG. 4 illustrates the equivalent circuit for the on state of the FIG. 3 circuit wherein overshoot and ringing occur.
Figure 5:
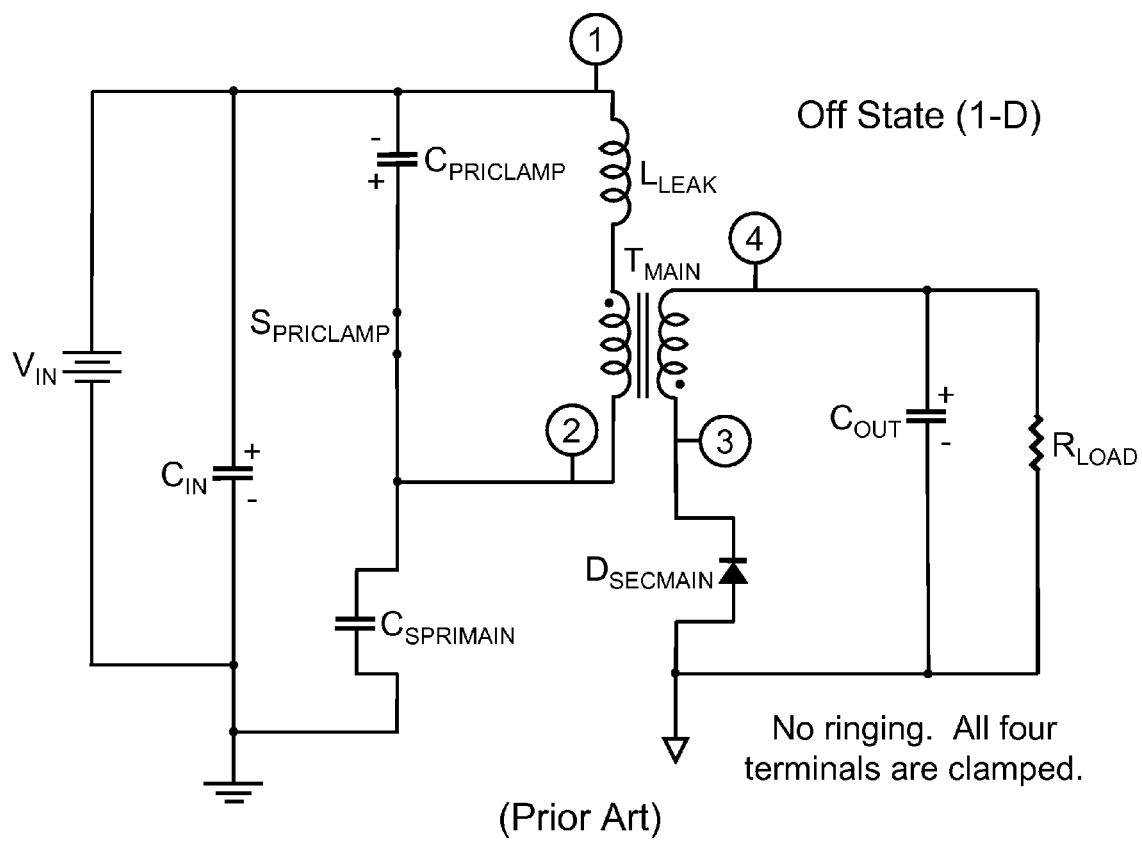
FIG. 5 illustrates the equivalent circuit for the off state of the FIG. 3 circuit wherein no overshoot or ringing occurs.
Figure 6:
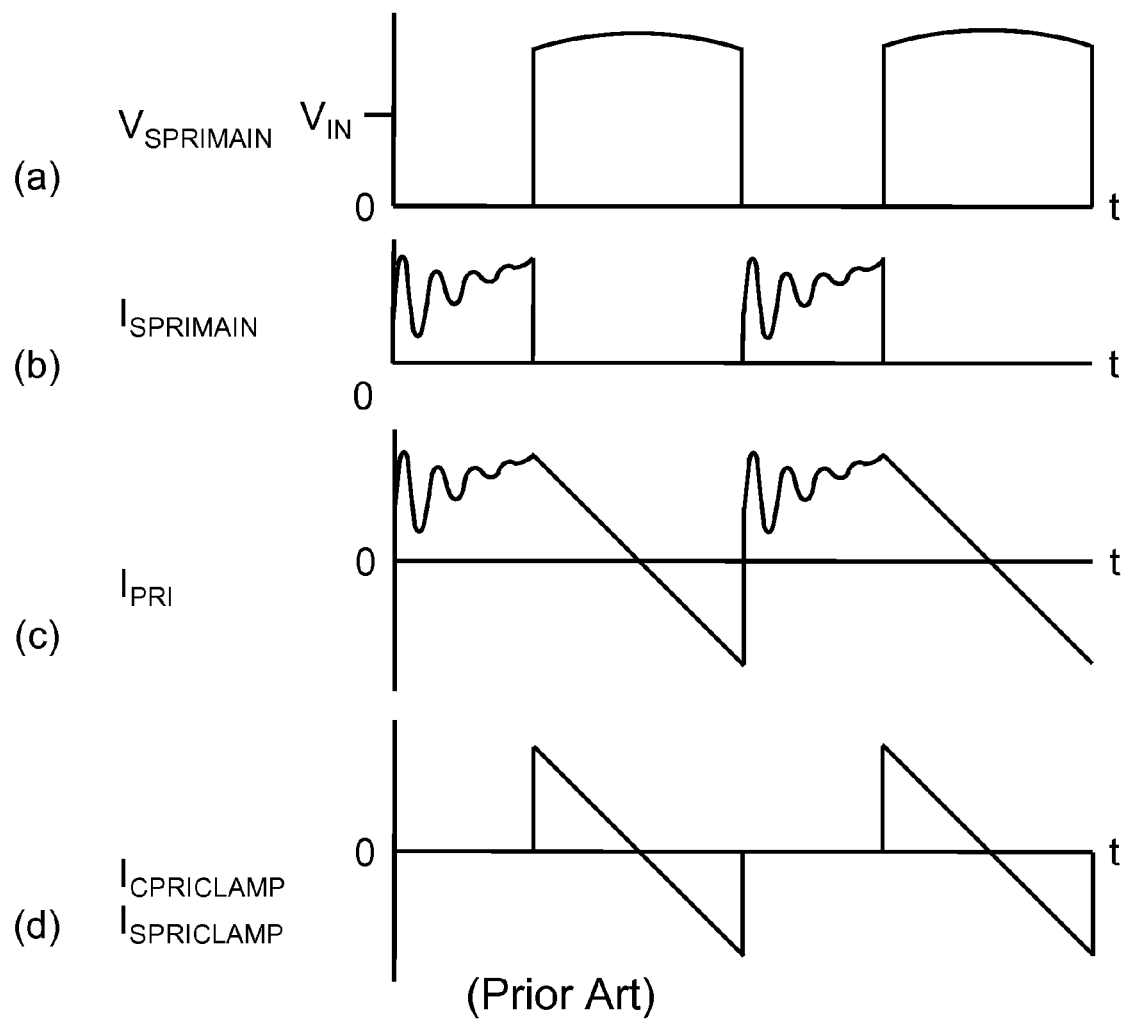
FIG. 6(a) illustrates the drain source wave form of the main primary switch of the FIG. 3 circuit.
FIG. 6(b) illustrates the drain current wave form of the main primary switch of the FIG. 3 circuit.
FIG. 6(c) illustrates the transformer primary current wave form of the FIG. 3 circuit.
FIG. 6(d) illustrates current wave form for the primary active clamp switch and clamp capacitor of the FIG. 3 circuit.
FIG. 6(e) illustrates the voltage wave form of the secondary rectifier of the FIG. 3 circuit.
FIG. 6(f) illustrates the current wave form of the secondary rectifier and secondary winding of the FIG. 3 circuit.
Figure 6:
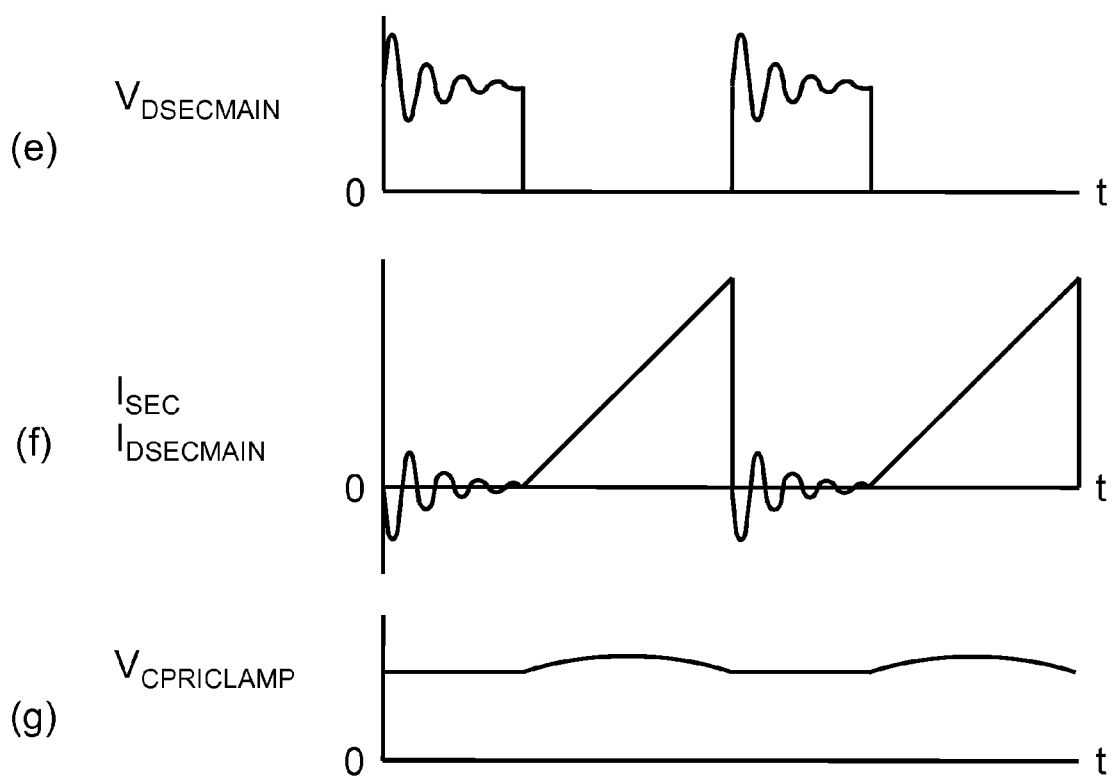
Figure 7:
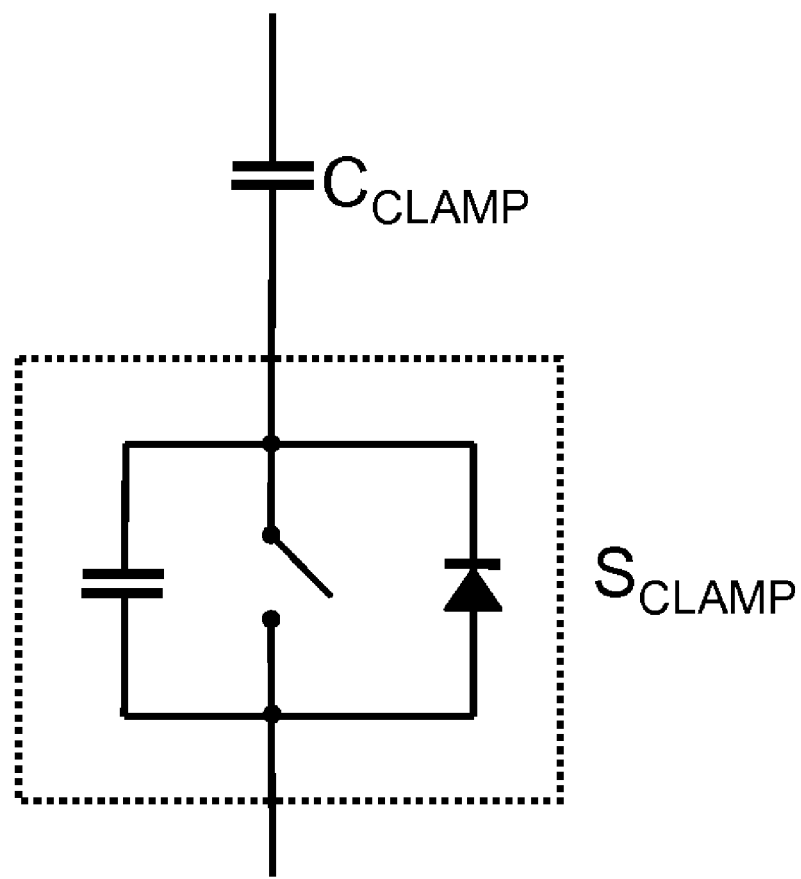
FIG. 7 illustrates an active clamp network comprising the series combination of a switch and a clamp capacitor.
Figure 8:
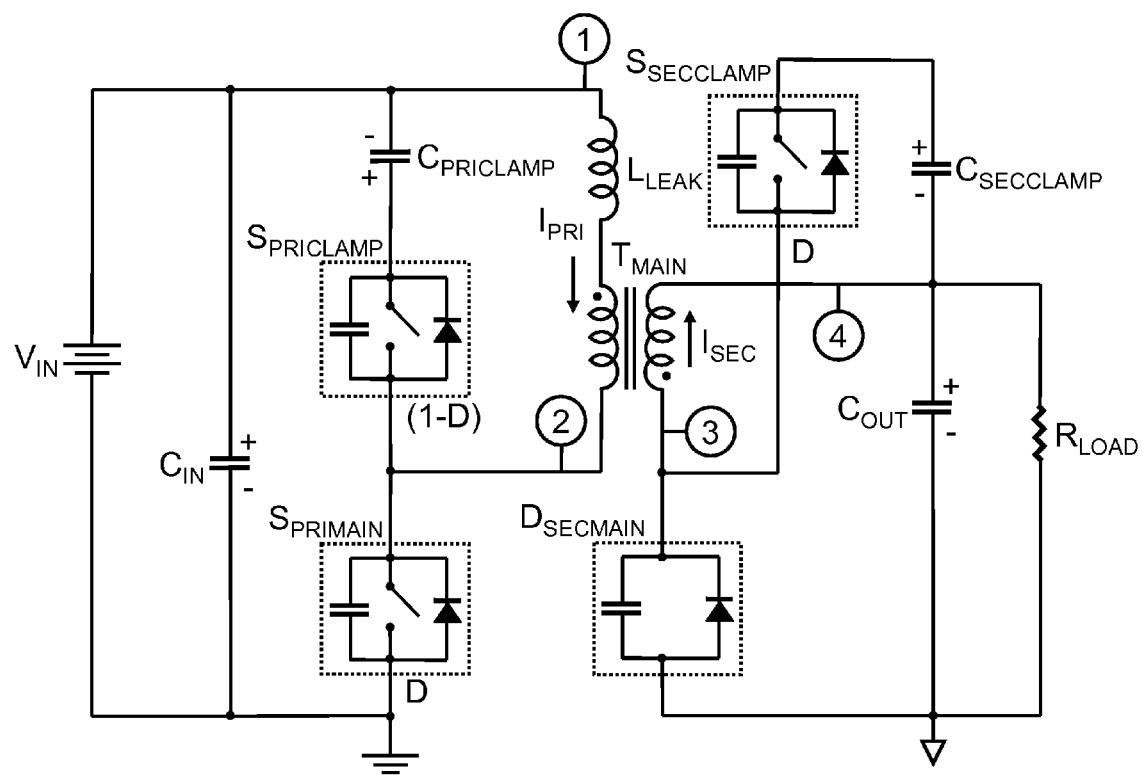
FIG. 8 illustrates a fully clamped flyback converter according to the subject invention.

FIG. 8 illustrates the FIG. 3 circuit with the addition of an improvement, which is the subject of this invention. The improvement consists of an active clamp network comprising an active clamp switch $S_{SECCLAMP}$ and a capacitor $C_{SECCLAMP}$.

In FIG. 8 a voltage source $V_{IN}$ has a first terminal connected to a first terminal of an input capacitor $C_{IN}$, to a first terminal of a clamp capacitor $C_{PRICLAMP}$, and to a first terminal of a primary winding of a flyback transformer $T_{MAIN}$. A second terminal of the voltage source $V_{IN}$ is connected to a second terminal of the input capacitor $C_{IN}$ and to a first terminal of a switch $S_{PRIMAIN}$. A second terminal of the switch $S_{PRIMAIN}$ is connected to a first terminal of a switch $S_{PRICLAMP}$ and to a second terminal of the primary winding of the transformer $T_{MAIN}$. FIG. 8 illustrates a leakage inductance $L_{LEAK}$ connected in series with the primary winding of the transformer $T_{MAIN}$, but it should be understood that $L_{LEAK}$ is an inherent part of $T_{MAIN}$ and is not separable from $T_{MAIN}$. From an operational point of view the transformer $T_{MAIN}$ behaves as though it has an uncoupled inductance $L_{LEAK}$ in series with its magnetically coupled primary winding. A second terminal of the switch $S_{PRICLAMP}$ is connected to a second terminal of the capacitor $C_{PRICLAMP}$. A first terminal of a secondary winding of the transformer $T_{MAIN}$ is connected to a cathode terminal of a rectifier $D_{SECMAIN}$ and to a first terminal of a switch $S_{SECCLAMP}$. An anode terminal of the rectifier $D_{SECMAIN}$ is connected to a first terminal of an output capacitor $C_{OUT}$ and to a first terminal of a load $R_{LOAD}$. A second terminal of the secondary winding of the transformer $T_{MAIN}$ is connected to a second terminal of the capacitor $C_{OUT}$, to a second terminal of the load $R_{LOAD}$, and to a first terminal of the capacitor $C_{SECCLAMP}$. A second terminal of the switch $S_{SECCLAMP}$ is connected to a second terminal of the capacitor $C_{SECCLAMP}$.

Figure 9:
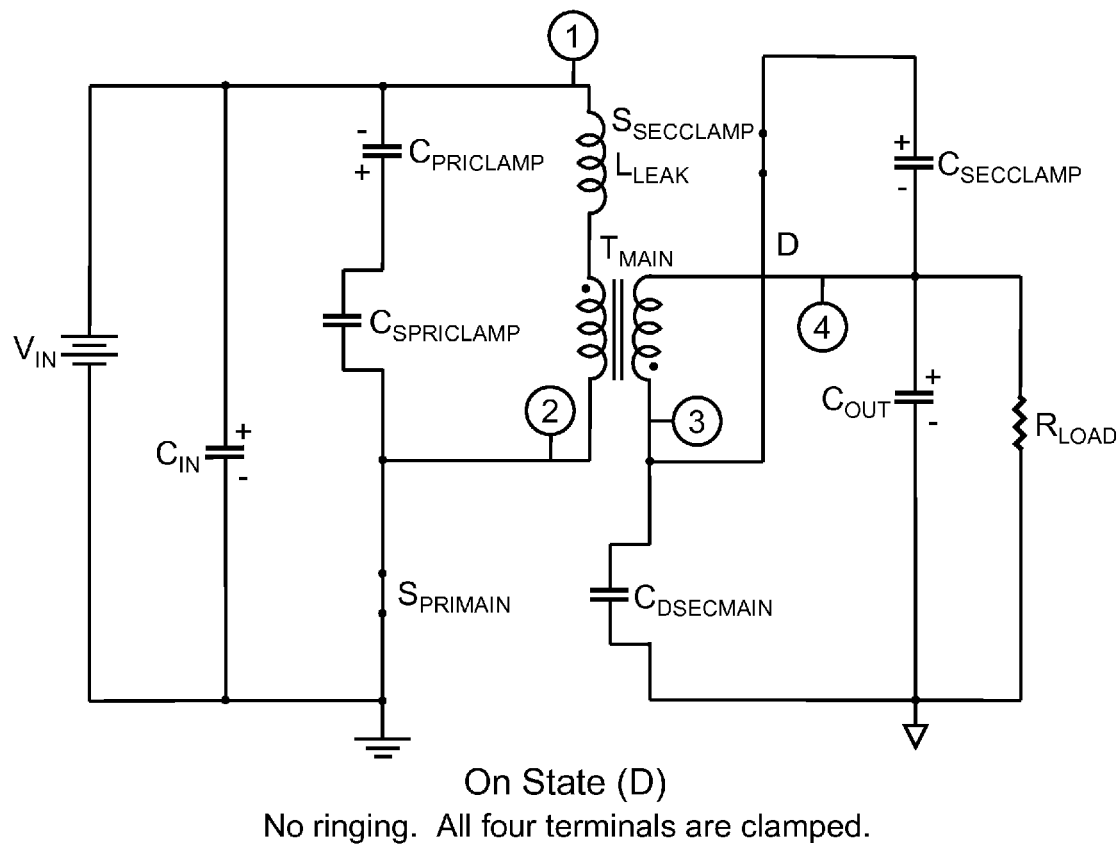
FIG. 9 illustrates an equivalent on state circuit of the FIG. 8 circuit according to the subject invention.
Figure 11:
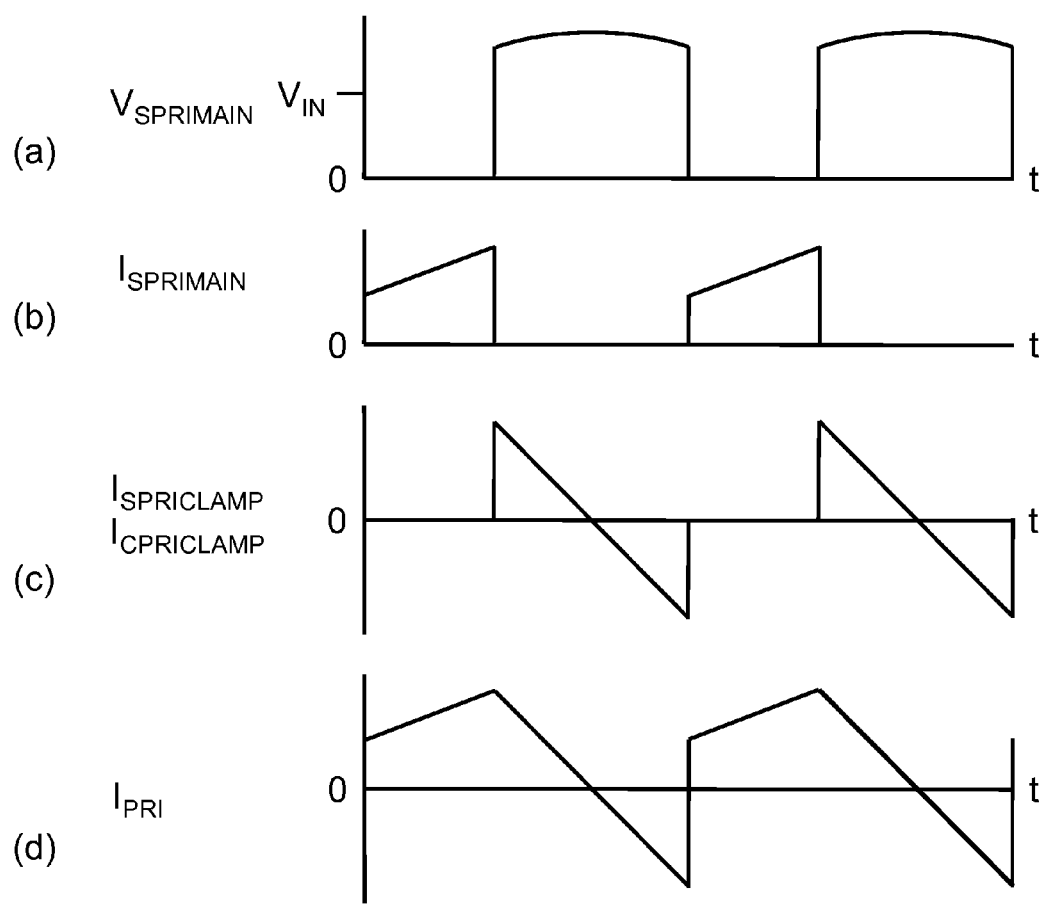
FIG. 11(a) illustrates a drain source voltage wave form of the main primary switch of the FIG. 8 circuit according to the subject invention.
FIG. 11(b) illustrates the drain current wave form of the main primary switch of the FIG. 8 circuit according to the subject invention.
FIG. 11(c) illustrates the drain current wave form of the primary clamp switch and the primary clamp capacitor current wave form of the FIG. 8 circuit according to the subject invention.
FIG. 11(d) illustrates the current wave form of the transformer primary winding of the FIG. 8 circuit according to the subject invention.
FIG. 11(e) illustrates the voltage wave form of the main secondary rectifier of the FIG. 8 circuit according to the subject invention.
FIG. 11(f) illustrates the current wave form of the main secondary switch of the FIG. 8 circuit according to the subject invention.
FIG. 11(g) illustrates the current wave form of the secondary clamp switch and the secondary clamp capacitor of the FIG. 8 circuit according to the subject invention.
FIG. 11(h) illustrates the current wave form of the transformer secondary winding of the FIG. 8 circuit according to the subject invention.
Figure 11:
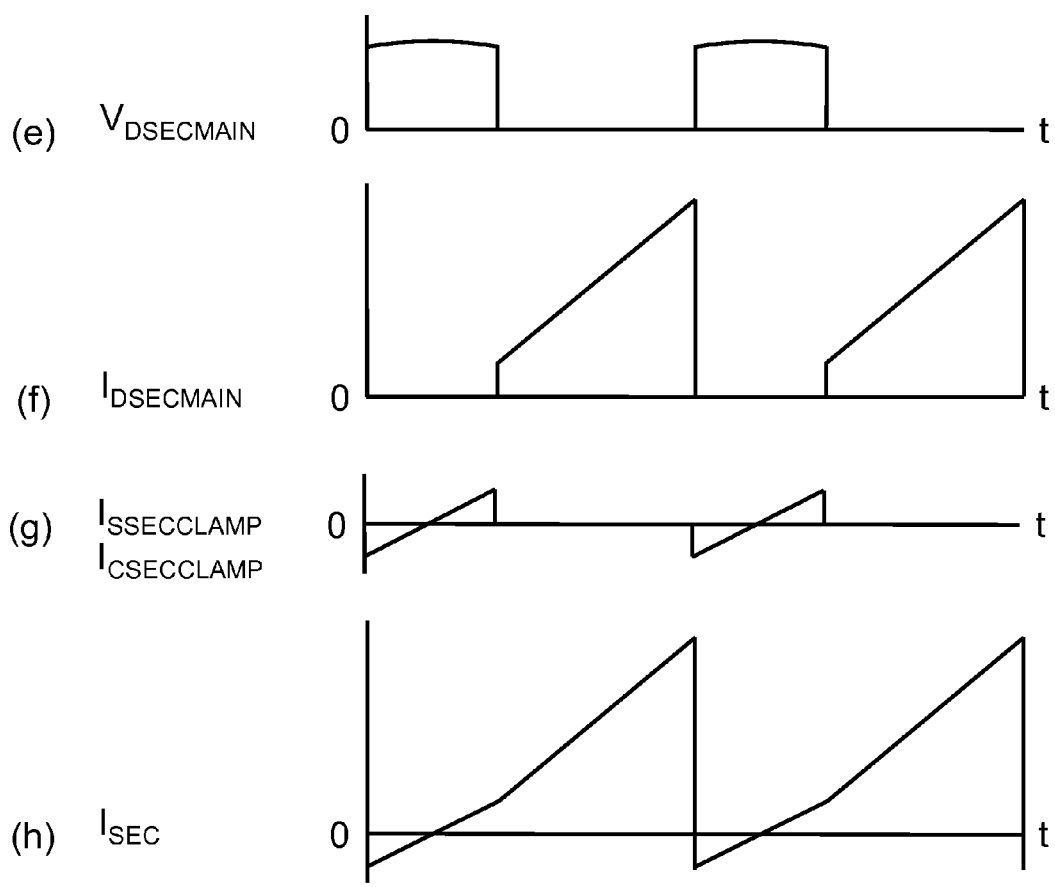

Except for brief switch transition times the circuit of FIG. 8 has two states of operation, an on state and an off state. An equivalent circuit of the on state is illustrated in FIG. 9. For purposes of analysis we will assume that the circuit is in a steady state of operation and that the capacitors are large and their voltages are invariant, unless explicitly stated otherwise. In the following descriptions and analyses we will refer to switches and rectifiers as being on, by which we mean in a low impedance conducting state, or off, by which we mean in a high impedance non-conducting state. In this analysis and in all subsequent analyses and descriptions in this application we shall consider two circuit nodes connected to opposite terminals of a switch or rectifier to be connected to each other when the switch or rectifier is on and disconnected from each other when the switch or rectifier is off. During the on state the switch $S_{PRIMAIN}$ is on and the input voltage source $V_{IN}$ applies its voltage to the primary winding of $T_{MAIN}$. The switch $S_{PRICLAMP}$ is off, so it appears in the circuit in the form of its intrinsic capacitance $C_{SPRICLAMP}$, whose capacitance is negligible in comparison to the capacitance of $C_{PRICLAMP}$ and whose voltage varies considerably during switching transitions from one operating state to another. During the on state, current ramps up and stored energy ramps up in the primary winding of transformer $T_{MAIN}$. The voltage and current in the $S_{PRIMAIN}$ switch are illustrated in FIGS. 11($a$) and 11($b$), respectively, and the current in the primary winding of the transformer $T_{MAIN}$ is illustrated in FIG. 11($d$). Also, during the on state, the switch $S_{SECCLAMP}$ is on, so that the voltage applied to the secondary winding of transformer $T_{MAIN}$ is clamped to the voltage of $C_{SECCLAMP}$. Current is exchanged between the secondary winding of $T_{MAIN}$ and the capacitor $C_{SECCLAMP}$ during the on state, as illustrated in FIG. 11($g$), first charging capacitor $C_{SECCLAMP}$ and then discharging $C_{SECCLAMP}$ by the same amount. During the on state the rectifier $D_{SECMAIN}$ appears in the circuit in the form of its intrinsic capacitance since $D_{SECMAIN}$ is reverse biased or off, during the on state. The intrinsic capacitance of $D_{SECMAIN}$ is negligible by comparison to the capacitance of $C_{SECCLAMP}$ and its voltage varies considerably during the switching transitions. During the on state both the primary winding and the secondary winding of $T_{MAIN}$ are connected to capacitors so that the winding voltages are invariant during the on state. Since the winding voltages are invariant there can be no ringing or overshoot at the primary and secondary windings of $T_{MAIN}$ during the on state, as any overshoot or ringing would require extremely large currents in order to significantly move the voltages of the capacitors $C_{IN}$ and $C_{SECCLAMP}$. It can be said that both the primary winding and secondary winding of $T_{MAIN}$ are clamped during the on state.

Figure 10:
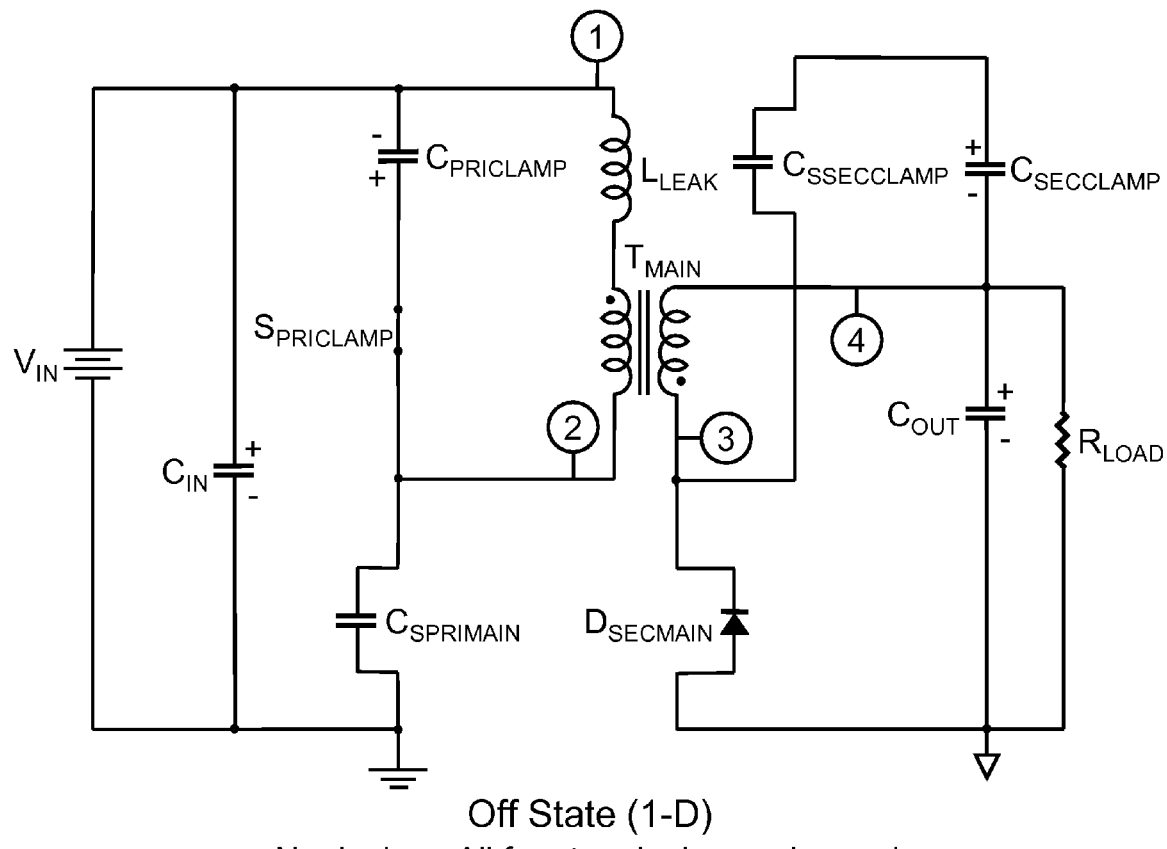
FIG. 10 illustrates an equivalent off state circuit of the FIG. 8 circuit according to the subject invention.

An off state of the FIG. 8 circuit is illustrated in FIG. 10. During the off state the switches $S_{PRIMAIN}$ and $S_{SECCLAMP}$ are off, the switch $S_{PRICLAMP}$ is on, and the rectifier $D_{SECMAIN}$ is forward biased or on. In the off state the primary winding of $T_{MAIN}$ is connected across the capacitor $C_{PRICLAMP}$ through $S_{PRICLAMP}$ and the secondary winding is connected across $C_{OUT}$ through $D_{SECMAIN}$. It can be said that both the primary winding and the secondary winding of $T_{MAIN}$ are clamped during the off state, so that no overshoot or ringing is possible during the off state, since both windings are connected to large value capacitors during the off state. Because of the leakage inductance $L_{LEAK}$ of transformer $T_{MAIN}$, primary winding current must ramp down gradually, as illustrated in FIG. 11($d$). Current is transferred gradually to the secondary winding during the off state, and the secondary winding currents build during the off state, as illustrated in FIGS. 11($f$) and 11($h$). During the off state the primary winding current reverses and the energy in $L_{LEAK}$ is directed so that it can provide energy to drive a zero voltage turn on transition for $S_{PRIMAIN}$ at the end of the off state. During the off state primary winding current first flows into $C_{PRICLAMP}$ and then flows out from $C_{PRICLAMP}$, as illustrated in FIG. 11($c$).

During both the on state and the off state of the FIG. 8 circuit both of the transformer $T_{MAIN}$ windings are clamped so that the voltages applied to both windings are invariant during both operating states. In this case we can say that, by the addition of the active clamp network, comprising $S_{SECCLAMP}$ and $C_{SECCLAMP}$, to the FIG. 3 circuit, the FIG. 8 circuit's transformer $T_{MAIN}$ is fully clamped. The FIG. 8 circuit has successfully used its leakage inductance to provide the benefit of zero voltage switching without the detriment of overshoot and ringing, which is usually the consequence of leakage inductance in prior art converters. The FIG. 8 circuit is identical to the prior art FIG. 3 circuit with the exception of the improvement provided by the addition of the active clamp network comprising $S_{SECCLAMP}$ and $C_{SECCLAMP}$.

Figure 41:
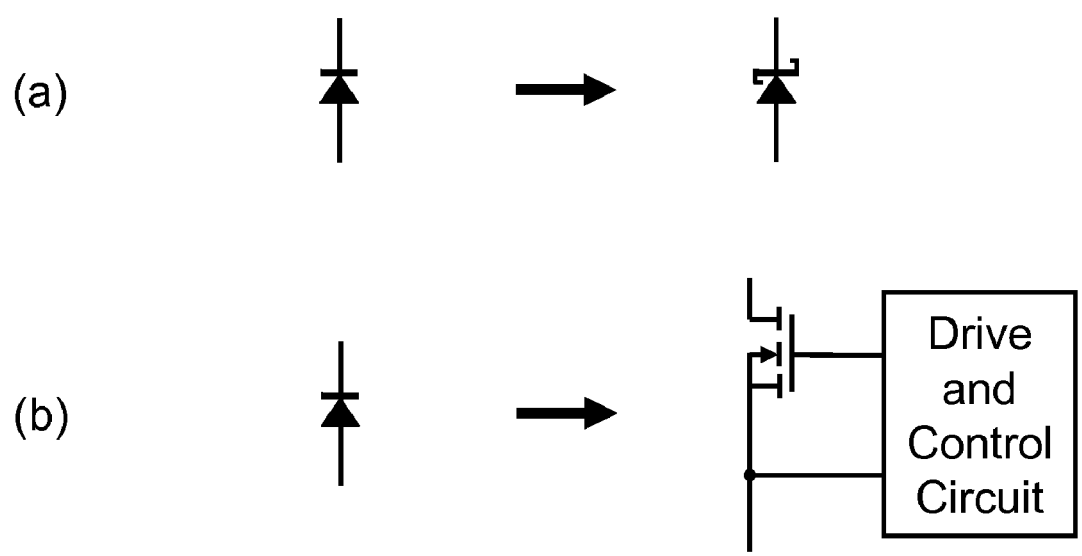
FIG. 41(a) illustrates that a schottky rectifier can be substituted for a junction rectifier.
FIG. 41(b) illustrates that a synchronous rectifier with a suitable drive and control circuit can be substituted for a junction rectifier.

In the FIG. 8 circuit the symbol used for the rectifier $D_{SECMAIN}$ is a symbol commonly associated with a junction rectifier. There is no aspect of the circuit's operation that prevents the use of a schottky rectifier in the FIG. 8 circuit, as illustrated in FIG. 41($a$). The arrow symbol in FIGS. 41($a$)

and 41(b) indicate substitution. Generally in circuits with low voltage outputs a schottky rectifier is preferable to a junction rectifier. Another option for the rectifier $D_{SECMAIN}$ is a synchronous rectifier, as illustrated in FIG. 41(b), which also requires a suitable control and drive circuit since a synchronous rectifier must be turned on and off at the appropriate times. In FIG. 8 and in the other embodiments of this invention, the figures will be illustrated with the symbol commonly associated with a junction rectifier, as was done in FIG. 8, but it should be understood that for this invention what is meant is that any rectifier can be used without restriction, including a schottky rectifier or a synchronous rectifier.

Figure 12:
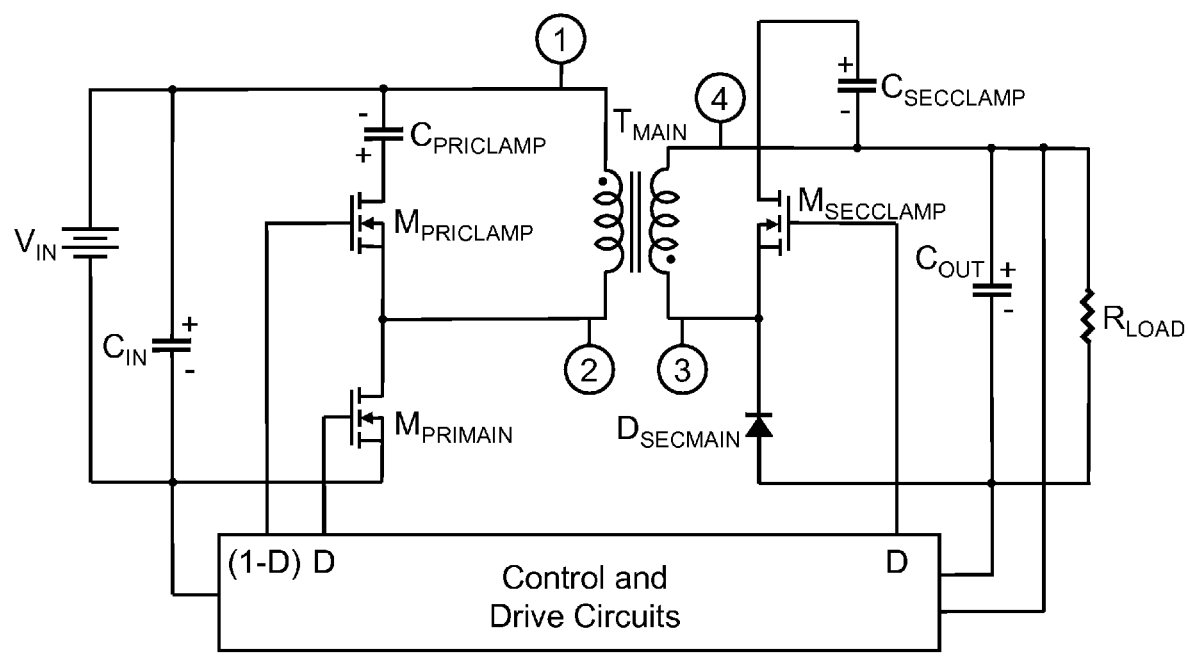
FIG. 12 illustrates a fully clamped flyback converter implemented with power mosfet switches according to the subject invention.

FIG. 12 illustrates an embodiment of the subject invention similar to the FIG. 8 circuit wherein the switches are implemented with power mosfets. In FIG. 12 the leakage inductance of $T_{MAIN}$ is assumed to exist and to be significant in value even though the leakage inductance is not shown explicitly in the figure.

Figure 13:
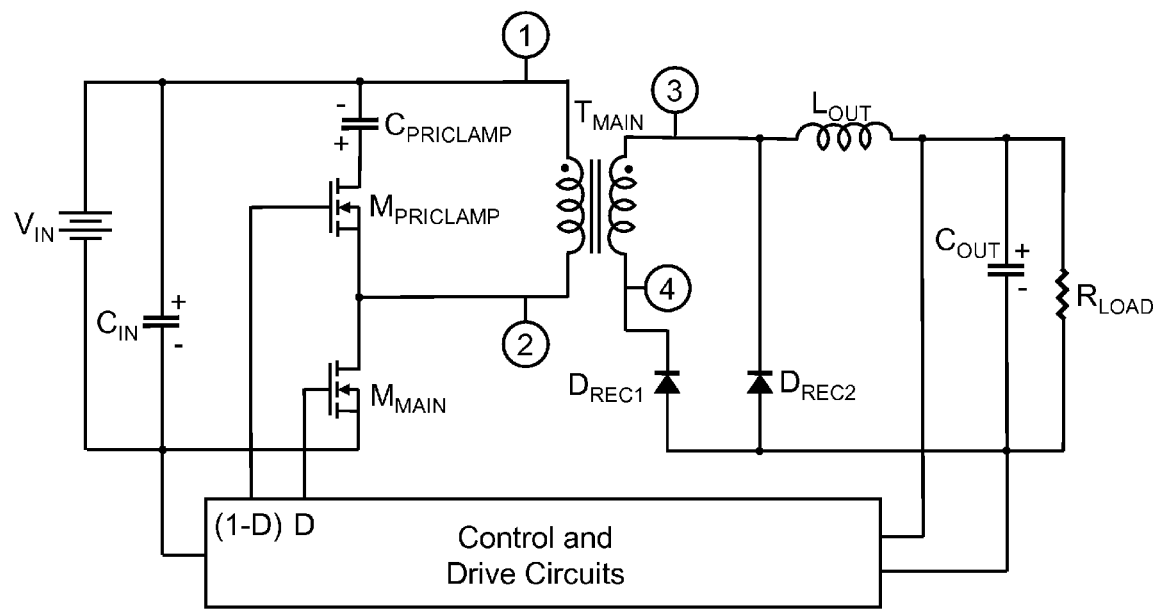
FIG. 13 illustrates a prior art active clamp single ended forward converter.

FIG. 13 illustrates a prior art single ended forward converter with an active clamp primary circuit. The rectifiers are arranged with their cathodes in common, connected to the negative terminal of $C_{OUT}$. This rectifier connection is not uncommon and is the preferred rectifier connection when the rectifiers are synchronous rectifiers. In the FIG. 13 circuit, during an on state, the terminal 3 of transformer $T_{MAIN}$ is unclamped. The on state is the state in which $M_{MAIN}$ is on. Overshoot and ringing commonly occur at terminal 3 during the on state of the converter. During an off state of the converter overshoot and ringing will typically occur at terminal 4. The overshoot and ringing in both cases is the result of leakage inductance in $T_{MAIN}$. The overshoot and ringing is typically minimized in practice by minimizing the leakage inductance of $T_{MAIN}$. Leakage inductance can be minimized by careful transformer design. Leakage inductance is a function of the relative geometries of the two coupled windings. Window areas and windings that are broad, but not high, provide lower leakage inductance. Interleaving the primary and secondary windings also drastically reduces leakage inductance, but at a higher cost. Other remedies for overshoot and ringing include the use of clamp circuits and snubber circuits.

Figure 14:
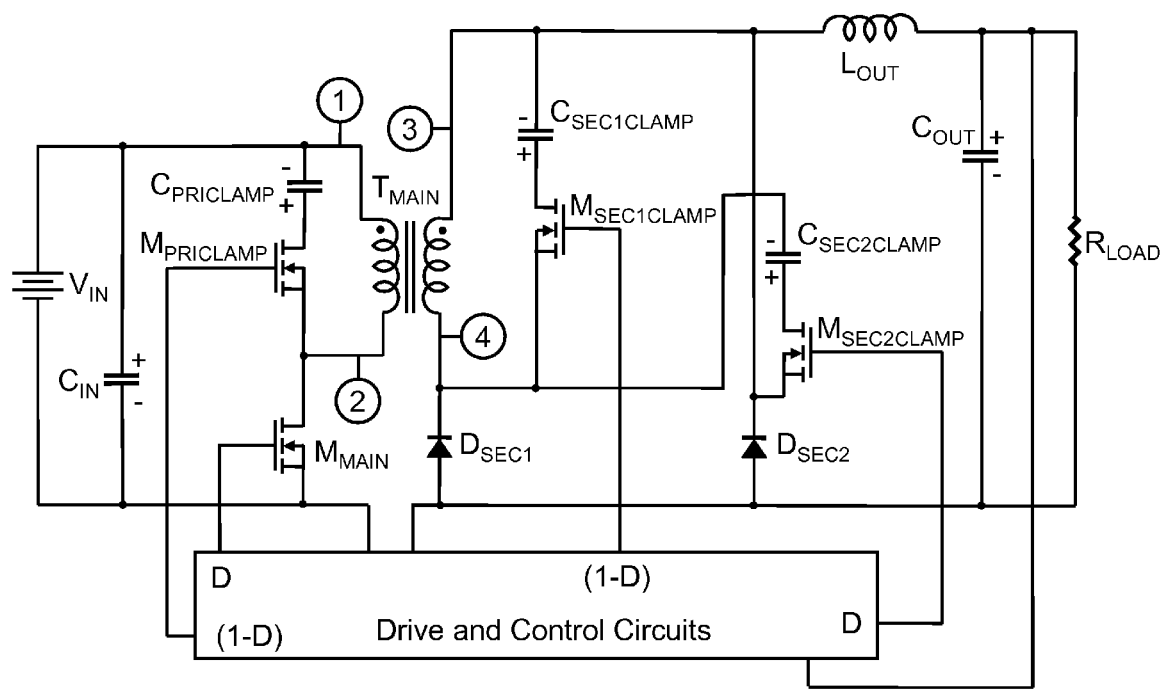
FIG. 14 illustrates a fully clamped single ended forward converter according to the subject invention.

FIG. 14 illustrates an embodiment of the subject invention wherein active clamp networks are added to fully clamp the FIG. 13 circuit. An active clamp network comprising $M_{SEC2CLAMP}$ and $C_{SEC2CLAMP}$ connected across the secondary winding as shown, wherein $M_{SEC2CLAMP}$ is turned on during the on state and is turned off during the off state, eliminates overshoot and ringing during the on state. An active clamp network comprising $M_{SEC1CLAMP}$ and $C_{SEC1CLAMP}$ connected across the secondary winding as shown, wherein $M_{SEC1CLAMP}$ is turned on during the off state and is turned off during the on state, eliminates overshoot and ringing during the off state. By the addition of two active clamp networks the transformer $T_{MAIN}$ is fully clamped. The FIG. 14 circuit can be made to be zero voltage switching by increasing the leakage inductance of $T_{MAIN}$ and reducing the magnetizing inductance of $T_{MAIN}$, which can be accomplished by gapping the core of $T_{MAIN}$.

Figure 15:
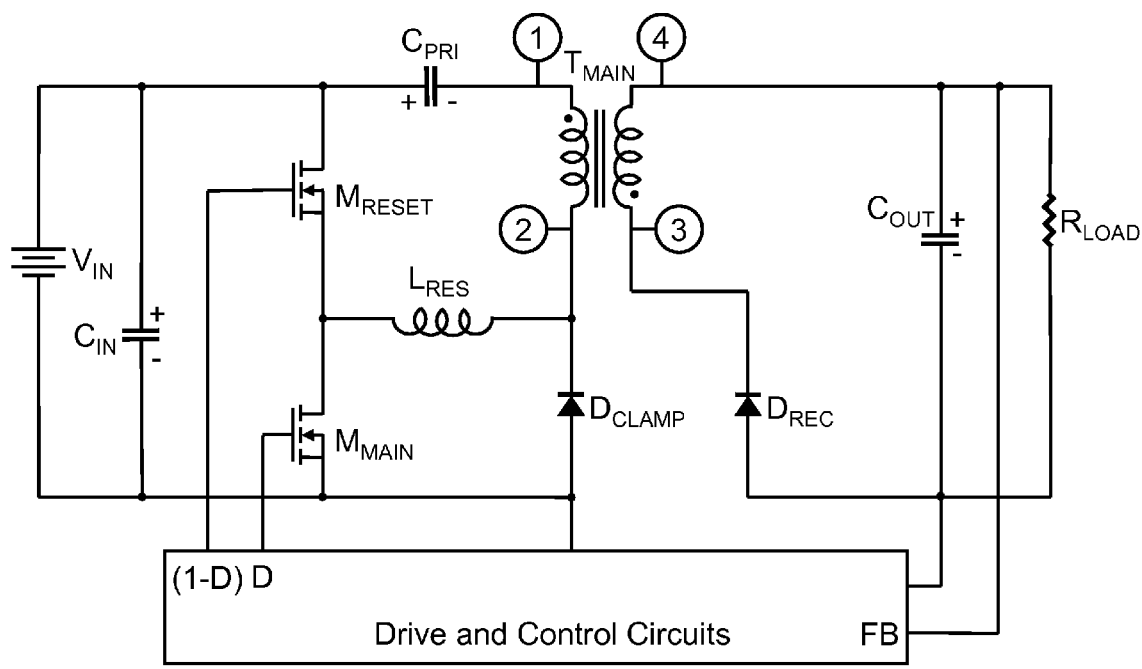
FIG. 15 illustrates a prior art coupled inductor buck converter.

FIG. 15 illustrates a zero voltage switching coupled inductor buck converter according to the prior art. The circuit, as it is shown, does not have any significant overshoot or ringing problems and is in use as a commercial product without using any additional snubbers or clamps. It would appear that overshoot and ringing would occur at terminal 3 of $T_{MAIN}$, since terminal 3 is not clamped for leakage inductance energy. The transformer $T_{MAIN}$ in the commercially successful designs is designed with minimal leakage inductance so the terminal 3 overshoot and ringing is insignificant. The terminal 3 overshoot and ringing is excessive if the rectifier $D_{CLAMP}$ is removed, but the overshoot and ringing is then driven by $L_{RES}$. Energy stored in $L_{RES}$ at the end of the off state is used to drive a zero voltage turn on transition for $M_{MAIN}$. The inductor $L_{RES}$ is considerably smaller than $T_{MAIN}$, but its size and cost are still significant. Eliminating $L_{RES}$ would provide a significant cost and size benefit. If an amount of inductance equal to $L_{RES}$ were to be added to the leakage inductance of $T_{MAIN}$ then the leakage inductance could provide the energy needed to drive the zero voltage turn on transition of $M_{MAIN}$, but then there would be no place to connect $D_{CLAMP}$, which is the key ingredient for eliminating the ringing and overshoot of $L_{RES}$.

Figure 16:
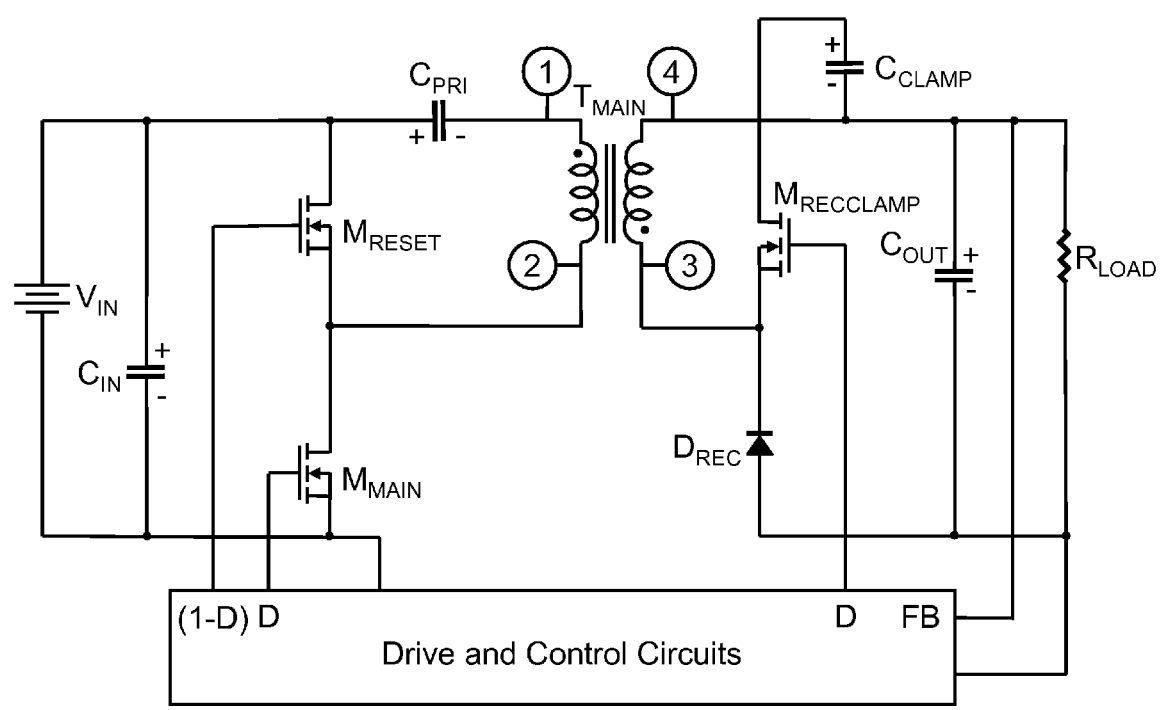
FIG. 16 illustrates a fully clamped coupled inductor buck converter according to the subject invention.

FIG. 16 illustrates a zero voltage switching coupled inductor buck converter according to the subject invention. The series inductance necessary to drive a zero voltage turn on transition for $M_{MAIN}$ is provided by leakage inductance purposely built into $T_{MAIN}$. An active clamp network is connected across the secondary winding of $T_{MAIN}$ to clamp any overshoot or ringing during the on state of the circuit. The active clamp network is comprised of a switch $M_{RECCLAMP}$ and a capacitor $C_{CLAMP}$. The switch $M_{RECCLAMP}$ is turned on during the on state of the circuit, so that $M_{RECCLAMP}$ operates in synchronization with $M_{MAIN}$. During the on state of the circuit, the primary winding of $T_{MAIN}$ is clamped by the series combination of $C_{IN}$ and $C_{PRI}$ through the switch $M_{MAIN}$. During the on state, the secondary winding is clamped by the capacitor $C_{CLAMP}$ through the switch $M_{RECCLAMP}$. During the off state, the primary winding of $T_{MAIN}$ is clamped by $C_{PRI}$ through the switch $M_{RESET}$. During the off state, the secondary winding of $T_{MAIN}$ is clamped through the rectifier $D_{REC}$. Both of the transformer windings are clamped during both of the operating states, so the transformer is fully clamped. Because the transformer $T_{MAIN}$ is fully clamped there will be no overshoot or ringing associated with the leakage inductance of $T_{MAIN}$. FIG. 16 is the result of a transformation that offers equivalent performance to its predecessor circuit, illustrated in FIG. 15, but with an additional active clamp network and elimination of an inductor and a rectifier. The net result will be a decrease in size and cost of the converter, since the inductor alone is likely to cost much more than the added active clamp network and to require much more space.

Figure 17:
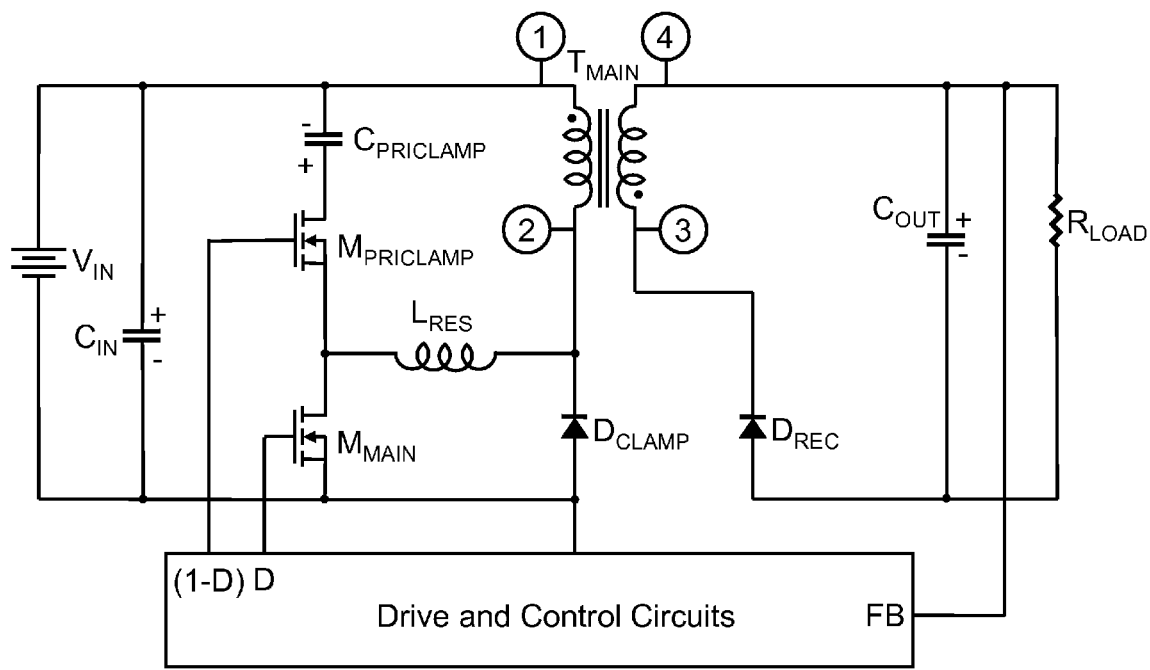
FIG. 17 illustrates a prior art active clamp flyback converter.

FIG. 17 is a zero voltage switching active clamp flyback converter according to the prior art. The FIG. 17 circuit provides one active clamp network, comprised of $M_{PRICLAMP}$ and $C_{PRICLAMP}$, to clamp the primary circuit windings during the off state of the main switch $M_{MAIN}$. As in the FIG. 15 circuit, a discrete inductor $L_{RES}$ is used to provide energy for a zero voltage turn on transition of the switch $M_{MAIN}$. It would be desirable to include $L_{RES}$ within $T_{MAIN}$ if the overshoot and ringing problem could be eliminated. The realization of a circuit that moves the inductor $L_{RES}$ into $T_{MAIN}$ and also eliminates ringing associated with the leakage inductance of $T_{MAIN}$ was illustrated in FIG. 12. In the FIG. 12 circuit the active clamp network in the secondary circuit together with the active clamp network in the primary circuit achieve a fully clamped $T_{MAIN}$. Incorporating $L_{RES}$ within $T_{MAIN}$ as the leakage inductance of $T_{MAIN}$ obviates the separate and discrete component $L_{RES}$ and reduces the size and cost of the power converter as a whole.

Figure 18:
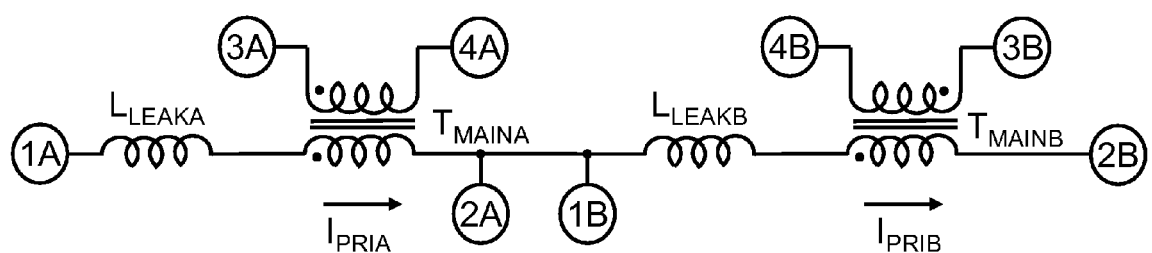
FIG. 18(a) illustrates two coupled magnetic circuit elements with their primary windings connected in series with their leakage inductances.
FIG. 18(b) illustrates the two series connected primary leakage inductances of FIG. 18(a) as one combined equivalent leakage inductance.
Figure 18:
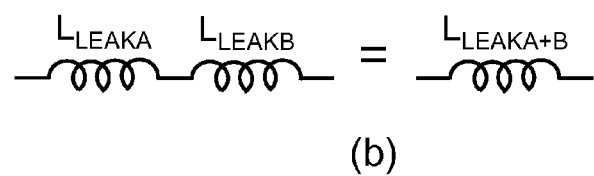

FIG. 18(a) illustrates two coupled inductors in which the primary windings of the two coupled inductors are connected in series. FIG. 18(b) illustrates that two series connected inductors have an equivalent inductance, and can be treated as a single inductance, equal to the sum of the two inductances. Because of the relationship of series inductors illustrated in FIG. 18(b) the primary winding connection of FIG. 18(a) can be treated as two series connected coupled windings in series with a single leakage inductance.

Figure 1:
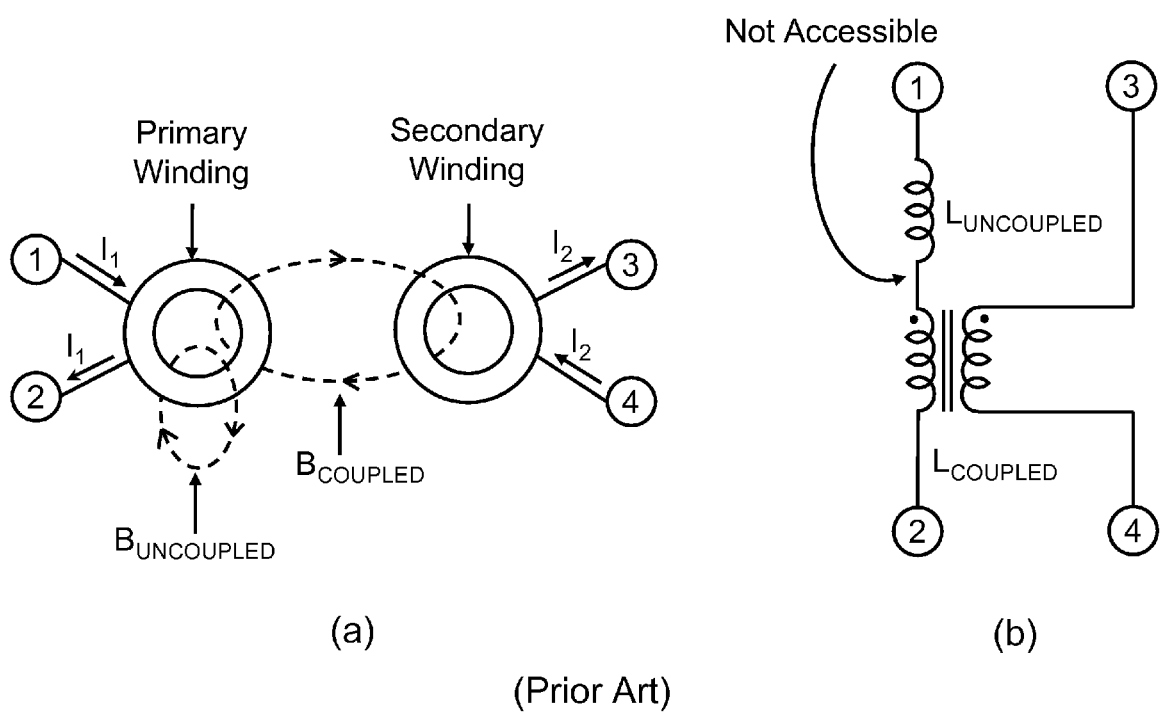
FIG. 1(a) illustrates a coupled magnetic circuit element with two windings in which some of the magnetic flux generated by the first winding is coupled to the second winding and some of the magnetic flux generated by the first winding does not couple to the second winding.
FIG. 1(b) illustrates an equivalent circuit for a coupled magnetic circuit element containing coupled or mutual inductance and uncoupled or leakage inductance.
Figure 2:
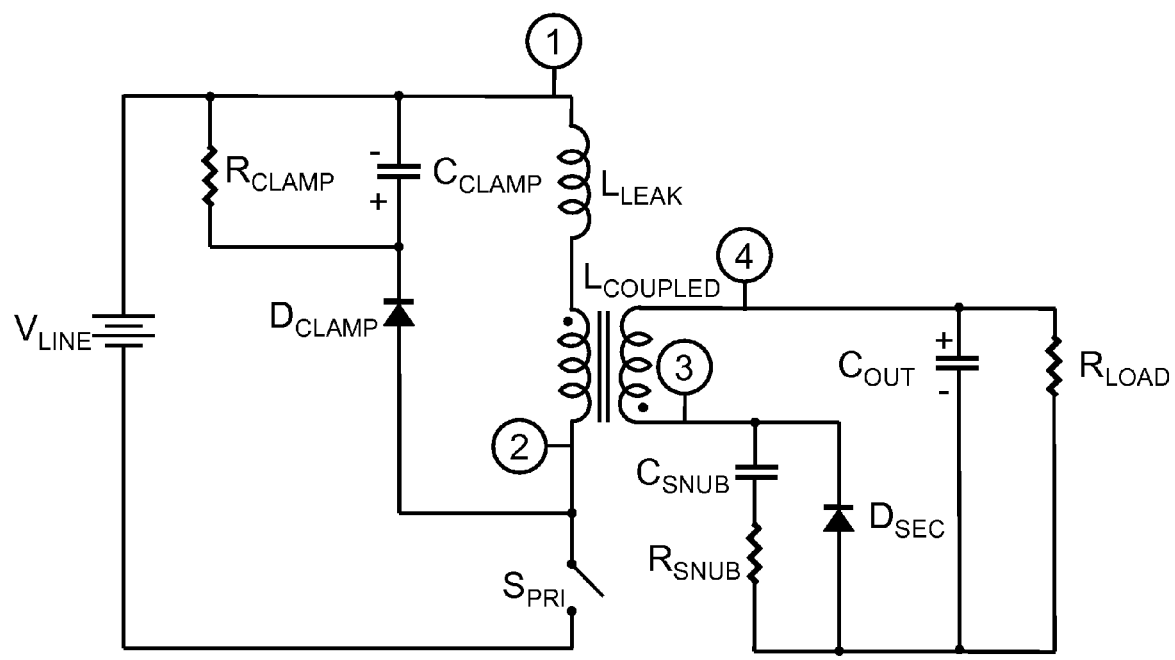
FIG. 2 illustrates a flyback power converter circuit with a dissipative primary clamp circuit and a dissipative secondary snubber circuit.
Figure 43:
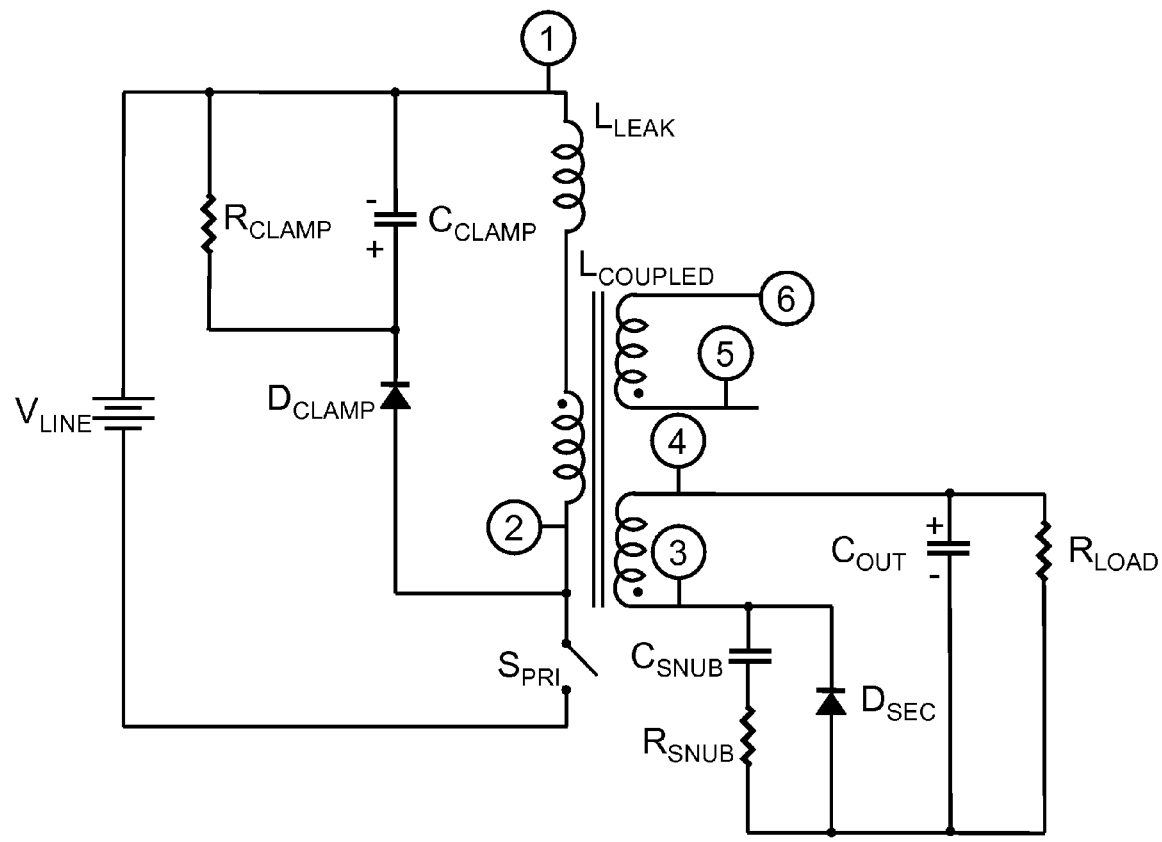
FIG. 43 illustrates the FIG. 2 circuit with an additional unconnected winding on the main transformer.

FIG. 43 illustrates the FIG. 2 circuit with a main transformer having two secondary windings. A first secondary winding is connected as in FIG. 2 and a second secondary winding has no connections. Will the second secondary winding's terminals be points where overshoot and ringing occur? There is energy associated with overshoot and ringing. In order for overshoot and ringing to exist at a transformer terminal there must be an element that can transmit, receive, store, or dissipate energy. At the terminals of the second secondary winding there is no mechanism to provide for overshoot and ringing. Because there is no mechanism to support ringing at the terminals of the second secondary winding there is no need to clamp the terminals to prevent potential ringing. If a winding with open terminals is added to a coupled inductor that is fully clamped, with the exception of the winding with the open terminals, then the coupled inductor will still be fully clamped with the addition of the new winding, even though the terminals of the new winding are not clamped. More specifically, the mechanism for overshoot and ringing is stored energy in an inductor, which is leakage inductance or, in some cases, magnetizing inductance, exchanging energy with a capacitor. Often the capacitor is a parasitic capacitor that is an inherent part of a semiconductor device, such as a diode or a transistor. If the impedance of the circuit at the winding terminals is resistive or inductive there exists no mechanism for oscillation. Oscillations will not occur unless there is also a parallel impedance with a capacitive component. In FIG. 18(a) the two series connected primary windings each have a terminal connected to the other primary winding. The impedance of the circuit external to a terminal connected to the other primary winding is inductive, so that no significant ringing is expected at either of the mutually connected primary windings and there is no need to individually clamp the primary windings. In most cases it suffices to provide clamping to the series combination of the two series connected primary windings.

Figure 19:
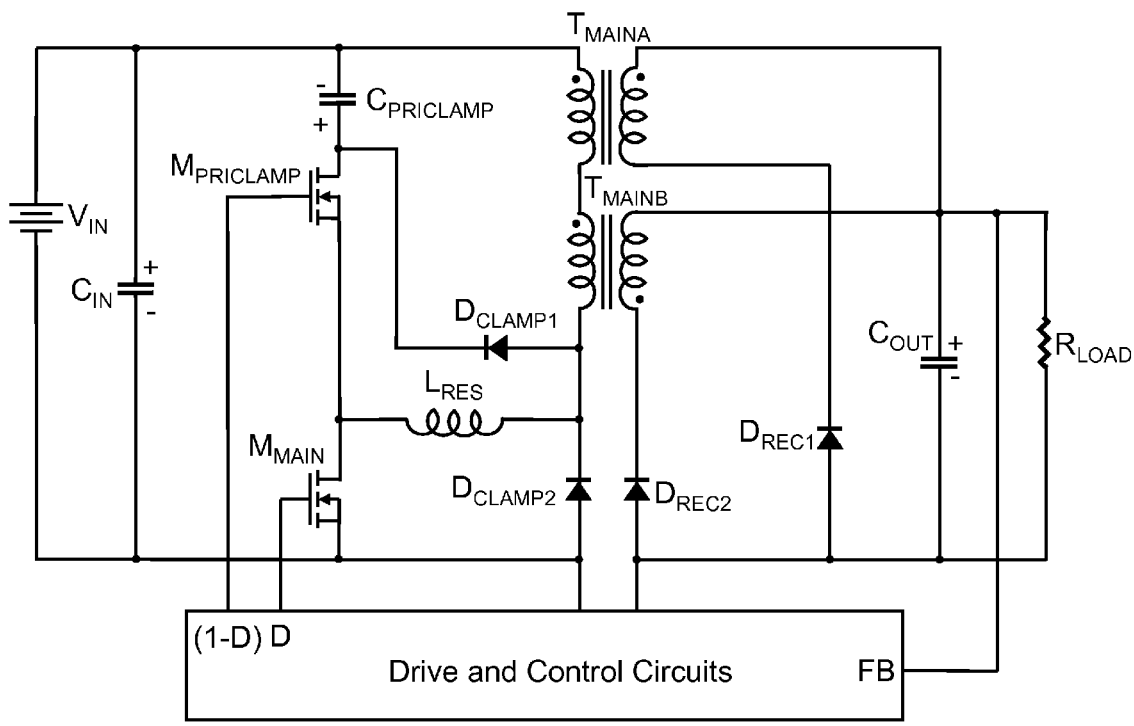
FIG. 19 illustrates a zero voltage switching double transformer active clamp flyback converter according to the prior art.

FIG. 19 is a prior art circuit similar to FIG. 17, but instead of a single transformer there are two transformers having the construction illustrated in FIG. 18(a) with series connected primary windings and parallel secondary circuits. The FIG. 19 circuit can be synthesized from a single ended forward converter. The FIG. 19 circuit has a forward converter transfer function and some other interesting and useful properties, including the ability to cancel the output ripple current at nominal line voltage. The fact that it is a forward converter with parallel secondaries suggests its employment in low output voltage applications that require non-pulsating output current and high bandwidth. The circuit can achieve zero voltage switching over wide line and load ranges if the transformer $T_{MAINA}$ has a gapped core. Rectifier $D_{CLAMP2}$ must be used to clamp ringing associated with $L_{RES}$ and the intrinsic parasitic capacitance of $D_{REC2}$, during the on state of the power supply. During the off state of the power supply $D_{CLAMP1}$ is used to clamp ringing associated with $L_{RES}$ and the intrinsic parasitic capacitance of $D_{REC1}$.

Figure 20:
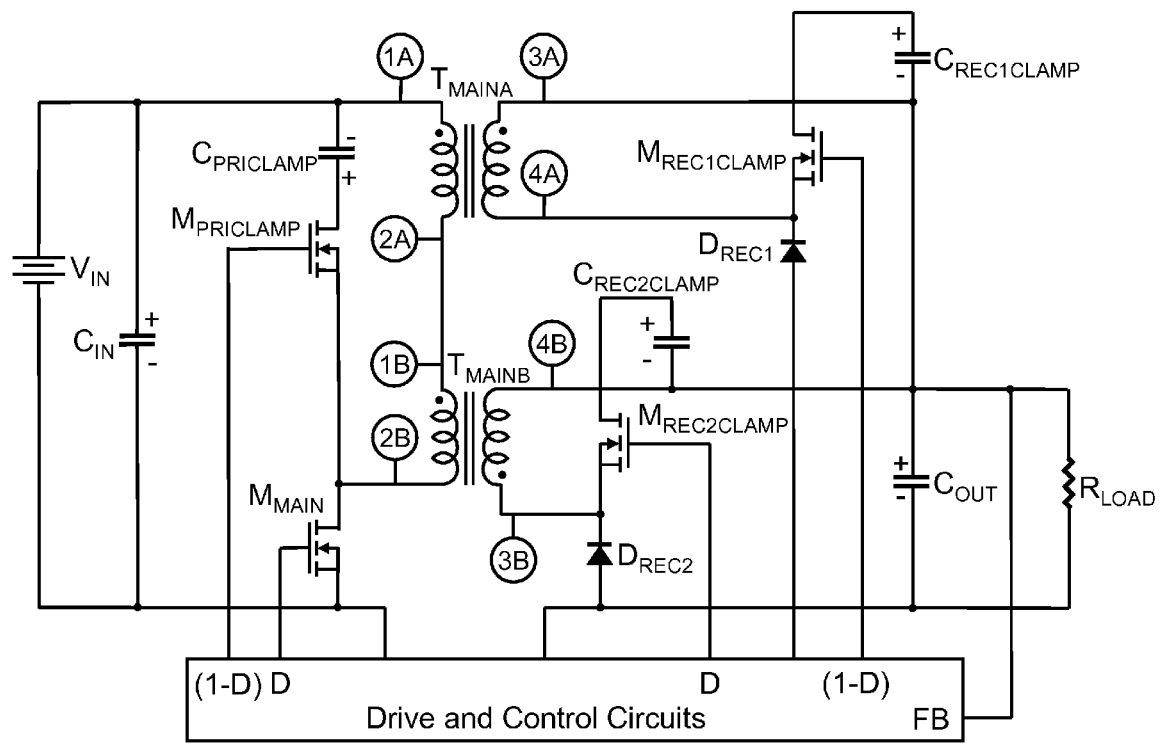
FIG. 20 illustrates a zero voltage switching double transformer fully clamped flyback converter according to the subject invention.

FIG. 20 is an embodiment of the subject invention wherein the improvement of the subject invention is applied to the FIG. 19 circuit. In FIG. 20 the leakage inductance in one or both transformers is increased to provide inductance equivalent in value to that provided by $L_{RES}$ in FIG. 19. Two secondary active clamp networks are added to the FIG. 19 circuit in FIG. 20 to fully clamp the two transformers in both operating states. During the on state of the power supply the primary winding network of the two transformers is clamped through $M_{MAIN}$ by $C_{IN}$, the $T_{MAINA}$ secondary winding is clamped through $D_{REC1}$ by $C_{OUT}$, and the $T_{MAINB}$ secondary winding is clamped through $M_{REC2CLAMP}$ by $C_{REC2CLAMP}$. During the off state of the power supply the primary winding network is clamped through $M_{PRICLAMP}$ by $C_{PRICLAMP}$, the $T_{MAINA}$ secondary winding is clamped through $M_{REC1CLAMP}$ by $C_{REC1CLAMP}$, and the $T_{MAINB}$ secondary winding is clamped through $D_{REC2}$ by $C_{OUT}$. By the addition of the two active clamp networks, not shown in FIG. 19, the two transformers are fully clamped and the circuit is able to use leakage inductance to drive a zero voltage turn on transition for the main switch $M_{MAIN}$. In the FIG. 20 circuit we have not sought to clamp each of the primary windings of the transformers individually for the reasons stated above in the description for FIGS. 18(a), 18(b), and 43.

Figure 21:
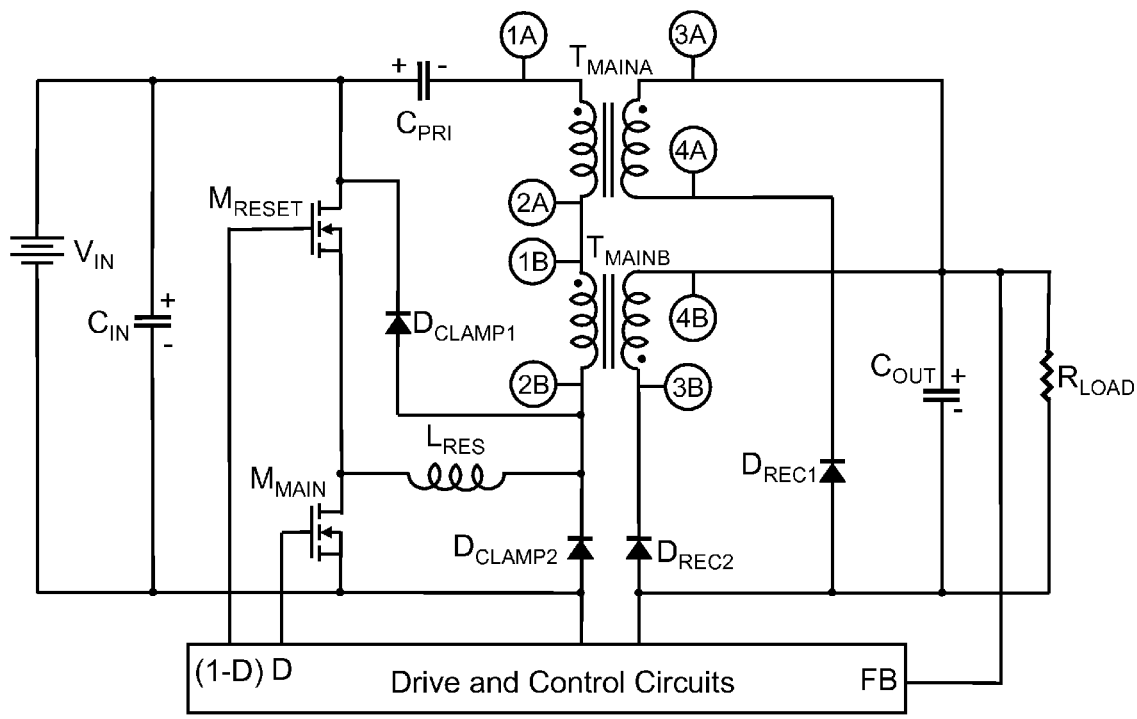
FIG. 21 illustrates a prior art zero voltage switching double transformer asymmetrical half bridge converter.

FIG. 21 is a prior art circuit similar to the circuit illustrated in FIG. 15, except that the double transformer structure is employed as in FIG. 19. The FIG. 21 circuit is an asymmetrical half bridge construction with a D*(1−D) type transfer function. Because of its parallel secondary circuits it is a compelling topology for applications with low output voltage and limited line range. It also has the ability to cancel output ripple current at the nominal line voltage. The inductor $L_{RES}$ provides a means to achieve zero voltage switching over a wide load range, but two clamp rectifiers are required to eliminate ringing associated with $L_{RES}$ and the intrinsic parasitic capacitances of the secondary side rectifiers $D_{REC1}$ and $D_{REC2}$.

Figure 22:
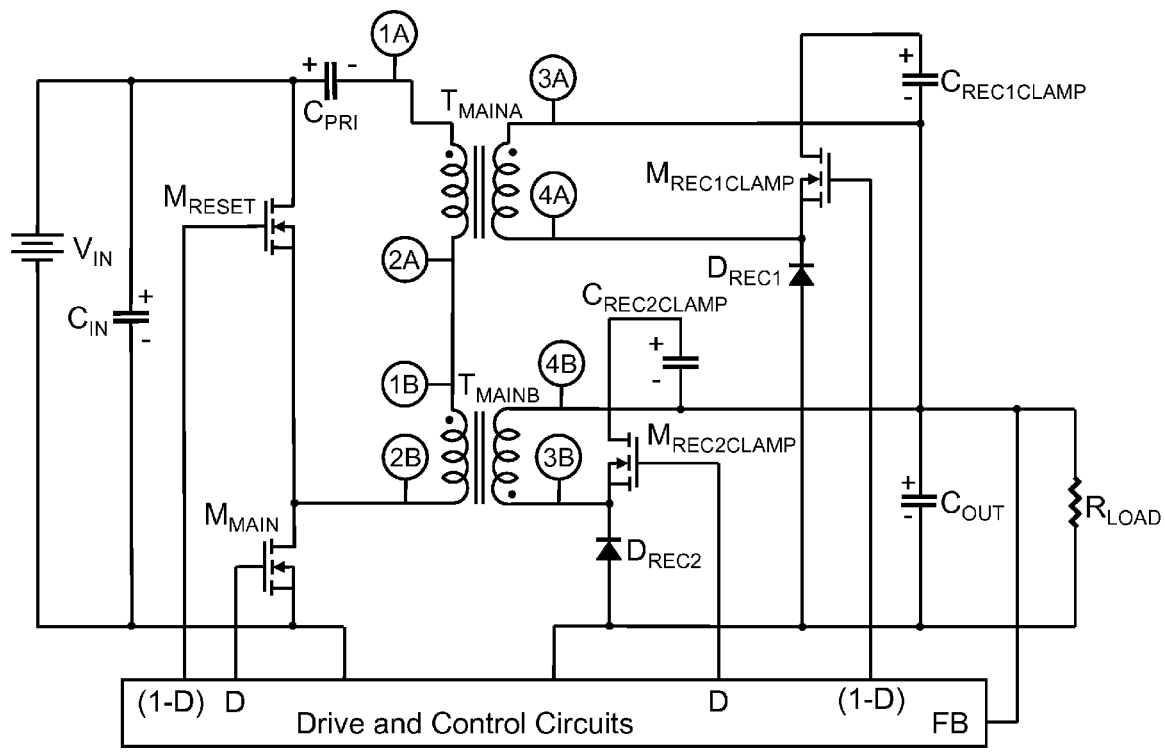
FIG. 22 illustrates a zero voltage switching fully clamped double transformer asymmetrical half bridge converter according to the subject invention.

FIG. 22 is an embodiment of the subject invention wherein the improvement of the subject invention is applied to the FIG. 21 circuit. In the FIG. 22 circuit the inductor $L_{RES}$ is eliminated and the leakage inductance in the primary winding network is increased to an inductance value equivalent to the inductance of $L_{RES}$. Also, the primary side clamp diodes $D_{CLAMP1}$ and $D_{CLAMP2}$ are eliminated. During an on state of the FIG. 22 circuit, the primary winding network is clamped through $M_{MAIN}$ by the series combination of $C_{IN}$ and $C_{PRI}$, the secondary winding of $T_{MAINA}$ is clamped through $M_{REC1CLAMP}$ by $C_{REC1CLAMP}$, and the secondary winding of $T_{MAINB}$ is clamped through the rectifier $D_{REC2}$ by $C_{OUT}$. During an off state of the FIG. 22 circuit, the primary winding network is clamped through $M_{RESET}$ by $C_{PRI}$, the secondary winding of $T_{MAINA}$ is clamped through $D_{REC1}$ by $C_{OUT}$, and the secondary winding of $T_{MAINB}$ is clamped through $M_{REC2CLAMP}$ by $C_{REC2CLAMP}$. In both operating states all of the windings of $T_{MAINA}$ and $T_{MAINB}$ are clamped so that no leakage inductance induced ringing can occur. The two transformers $T_{MAINA}$ and $T_{MAINB}$ are fully clamped. The leakage inductance of the two transformers is used for driving a zero voltage turn on transition for $M_{MAIN}$ without the adverse ringing effects normally associated with leakage inductance.

Figure 23:
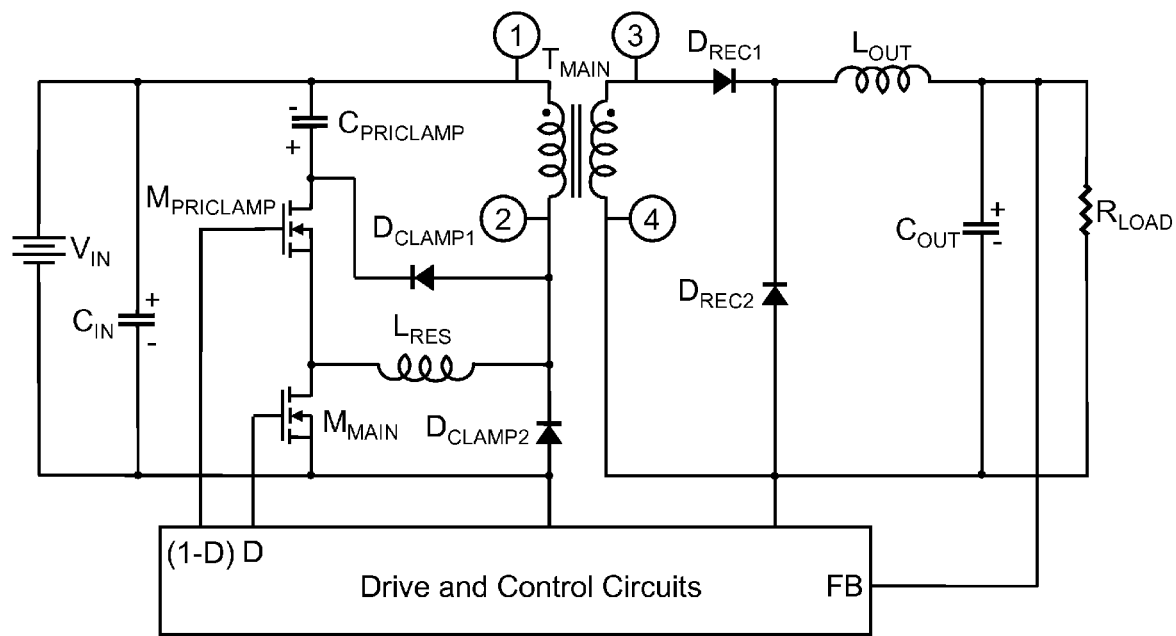
FIG. 23 illustrates a prior art zero voltage switching active clamp single ended forward converter.

FIG. 23 illustrates a prior art zero voltage switching single ended forward converter. The circuit relies on a discrete series inductor $L_{RES}$ in the primary circuit to provide the energy needed for a zero voltage turn on transition for the switch $M_{MAIN}$. Two primary circuit clamp rectifiers, $D_{CLAMP1}$ and $D_{CLAMP2}$, are needed to clamp ringing associated with the $L_{RES}$ inductor and the intrinsic parasitic capacitances of $D_{REC1}$ and $D_{REC2}$.

Figure 24:
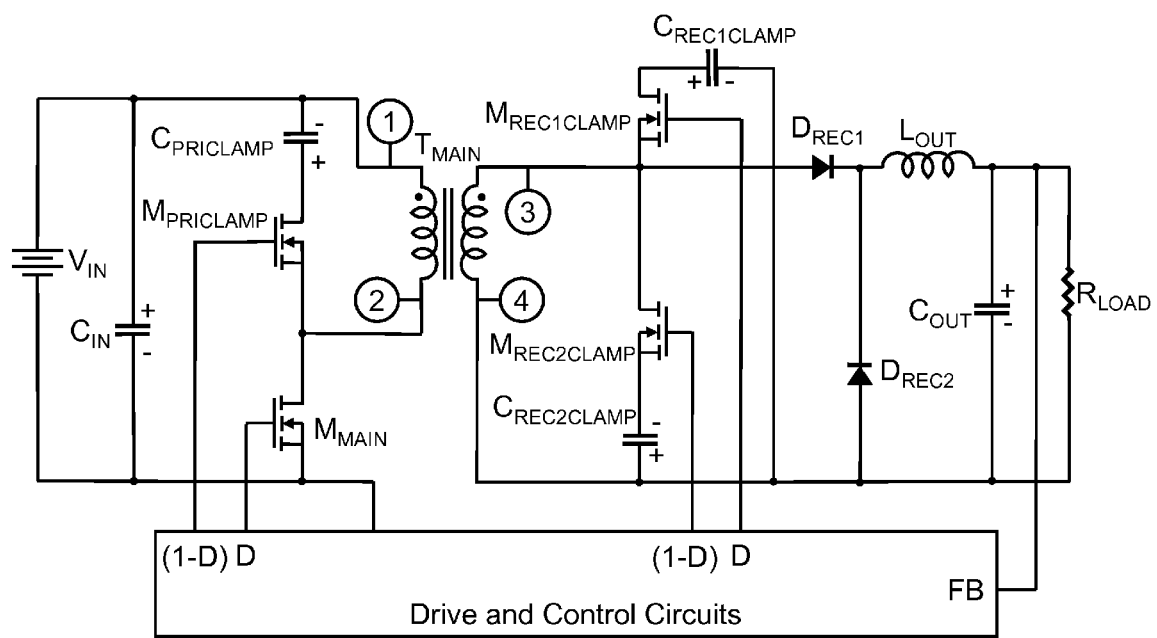
FIG. 24 illustrates a zero voltage switching fully clamped single ended forward converter according to the subject invention.

FIG. 24 illustrates an embodiment of the subject invention wherein the improvements of the subject invention are applied to the FIG. 23 circuit. In the FIG. 24 circuit the leakage inductance of the transformer is increased to a value equivalent to the inductance of the inductor $L_{RES}$ in the FIG. 23 circuit. The inductor $L_{RES}$ is eliminated and the clamp diodes, $D_{CLAMP1}$ and $D_{CLAMP2}$, are also eliminated. In an on state of the FIG. 24 circuit, the primary winding of $T_{MAIN}$ is clamped through $M_{MAIN}$ by the capacitor $C_{IN}$ and the secondary winding of $T_{MAIN}$ is clamped through $M_{REC1CLAMP}$ by the capacitor $C_{REC1CLAMP}$. During an off state of the FIG. 24 circuit, the primary winding of $T_{MAIN}$ is clamped through $M_{PRICLAMP}$ by the capacitor $C_{PRICLAMP}$ and the secondary winding of $T_{MAIN}$ is clamped through $M_{REC2CLAMP}$ by the capacitor $C_{REC2CLAMP}$. The transformer $T_{MAIN}$ is fully clamped to eliminate ringing, the leakage inductance energy is available to drive a zero voltage turn on transition of $M_{MAIN}$, and the primary circuit inductor $L_{RES}$ and primary circuit clamp diodes, $D_{CLAMP1}$ and $D_{CLAMP2}$, are eliminated with no adverse consequences.

Figure 25:
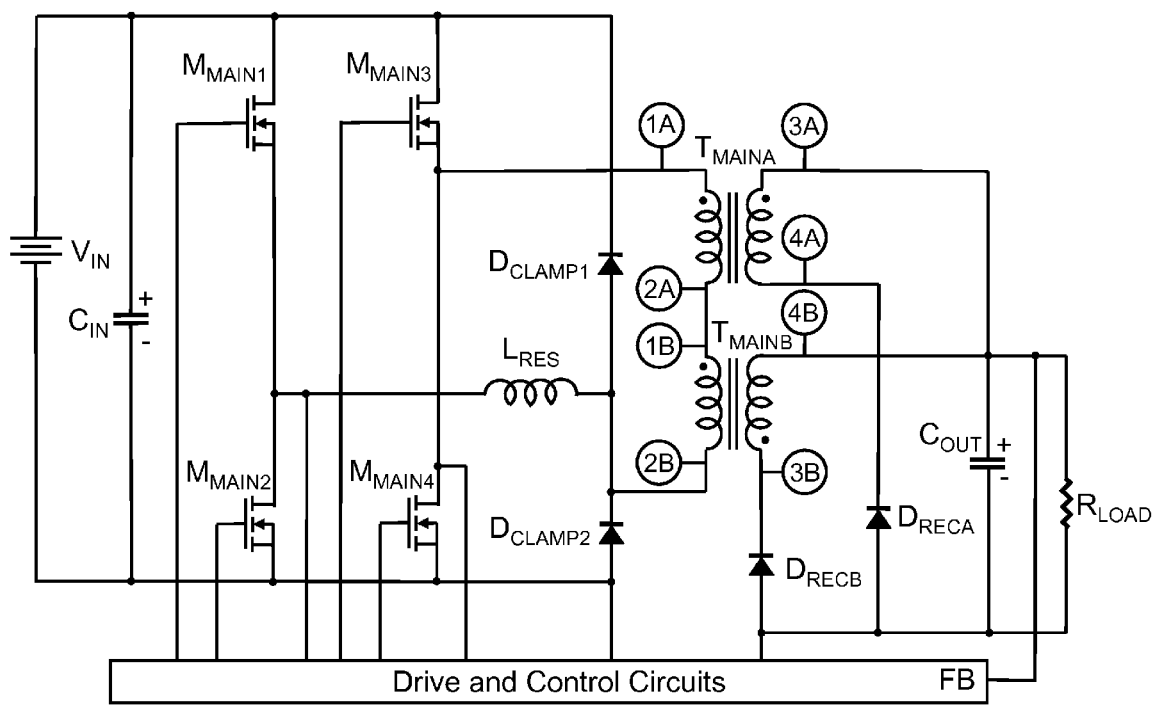
FIG. 25 illustrates a prior art zero voltage switching full bridge coupled inductor current doubler converter.

FIG. 25 illustrates a prior art circuit which can be called a full bridge coupled inductor buck converter. This circuit can be synthesized from two parallel interleaved coupled inductor buck converters. The circuit contains a primary side series inductor $L_{RES}$ which is used to drive zero voltage turn on transitions for the primary switches. The circuit has two on states and two off states per cycle. In a first on state switches $M_{MAIN1}$ and $M_{MAIN4}$ and rectifier $D_{RECB}$ are on. In a second on state switches $M_{MAIN2}$ and $M_{MAIN3}$ and rectifier $D_{RECA}$ are on. There are three options for the off states. In a first option there is one off state that occurs twice per cycle wherein switches $M_{MAIN2}$ and $M_{MAIN4}$ and rectifiers $D_{RECA}$ and $D_{RECB}$ are on. In a second option there is one off state that occurs twice per cycle wherein switches $M_{MAIN1}$ and $M_{MAIN3}$ and rectifiers $D_{RECA}$ and $D_{RECB}$ are on. In a third option there are two off states that each occur once per cycle and those two off states are the two off states described above for the first two options. In each case an on state is immediately followed by an off state. In the FIG. 25 circuit the two primary side clamp diodes, $D_{CLAMP1}$ and $D_{CLAMP2}$, prevent ringing associated with $L_{RES}$ and the intrinsic parasitic capacitances of the secondary side rectifiers.

Figure 26:
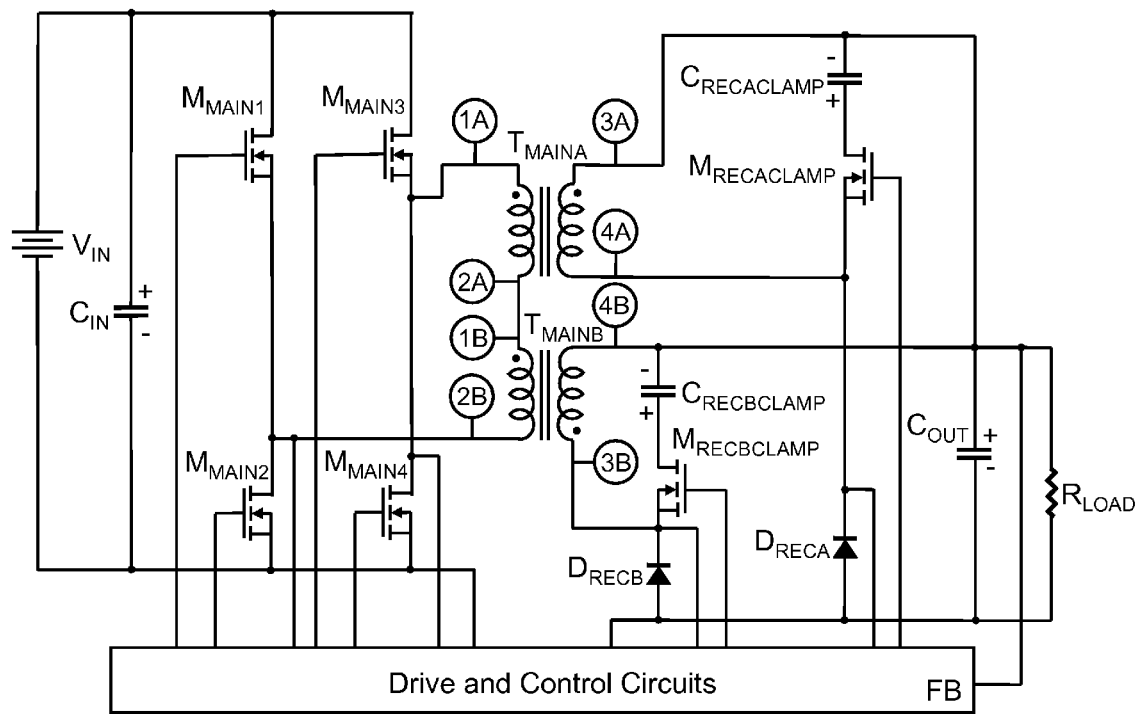
FIG. 26 illustrates a zero voltage switching fully clamped full bridge coupled inductor current doubler converter according to the subject invention.

The FIG. 26 circuit is an embodiment of the subject invention wherein the improvement of the subject invention is applied to the FIG. 25 circuit. In the FIG. 26 circuit the primary side inductor $L_{RES}$ and the two primary side clamp rectifiers, $D_{CLAMP1}$ and $D_{CLAMP2}$, are eliminated. The leakage inductances of the primary windings of the two transformers are increased to the point that the total leakage inductance is equivalent to the inductance of the inductor $L_{RES}$ in the FIG. 25 circuit. Two secondary side active clamp networks are added to achieve fully clamped transformers so that no overshoot and ringing can occur. The FIG. 26 circuit achieves zero voltage switching using the leakage inductance energy with no adverse effects from the use of the leakage inductance.

Figure 44:
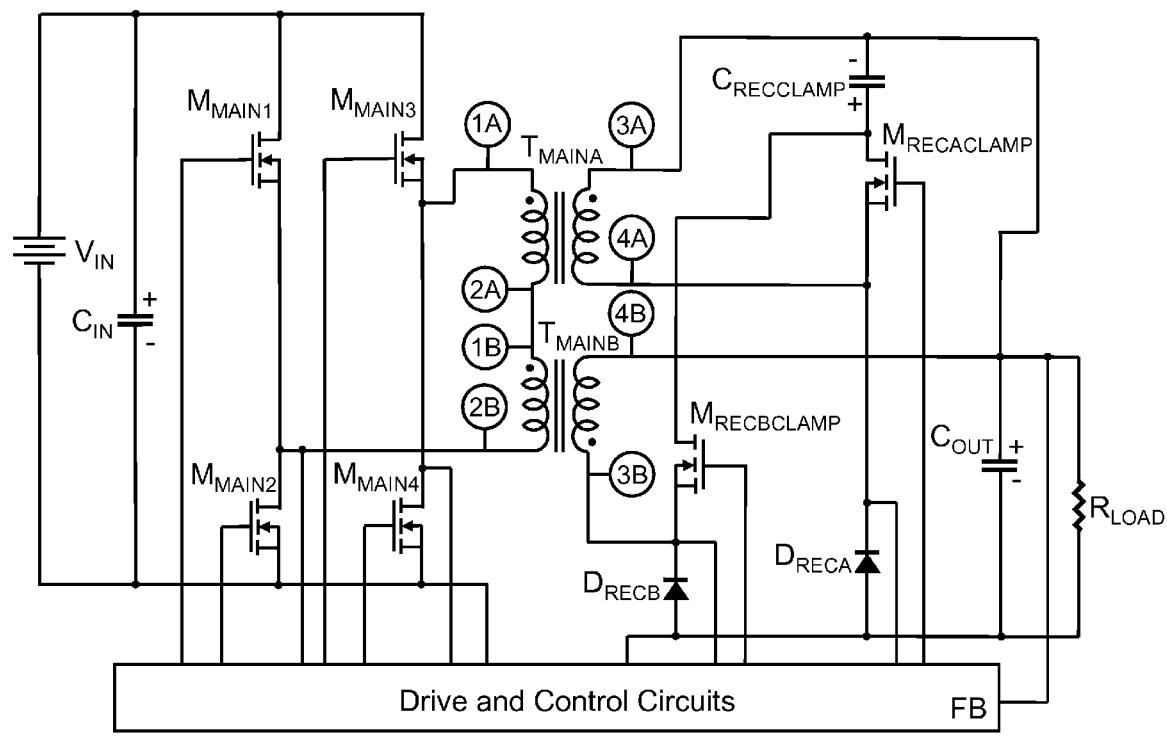
FIG. 44 illustrates the FIG. 26 circuit with two secondary side active clamp networks sharing a common capacitor.

If the transformers $T_{MAINA}$ and $T_{MAINB}$ are identical then the FIG. 26 circuit will be fully symmetrical and we can expect that the currents and voltages associated with the two transformers will be identical, but 180 degrees separated in phase. In this case we would expect from the symmetry that the voltage at the positive terminal of $C_{RECACLAMP}$ will be identical to the voltage at the positive terminal of $C_{RECBCLAMP}$, which suggests that the two capacitors can be combined into a single capacitor, $C_{RECCLAMP}$, as illustrated in FIG. 44, which is another embodiment of the subject invention.

Figure 27:
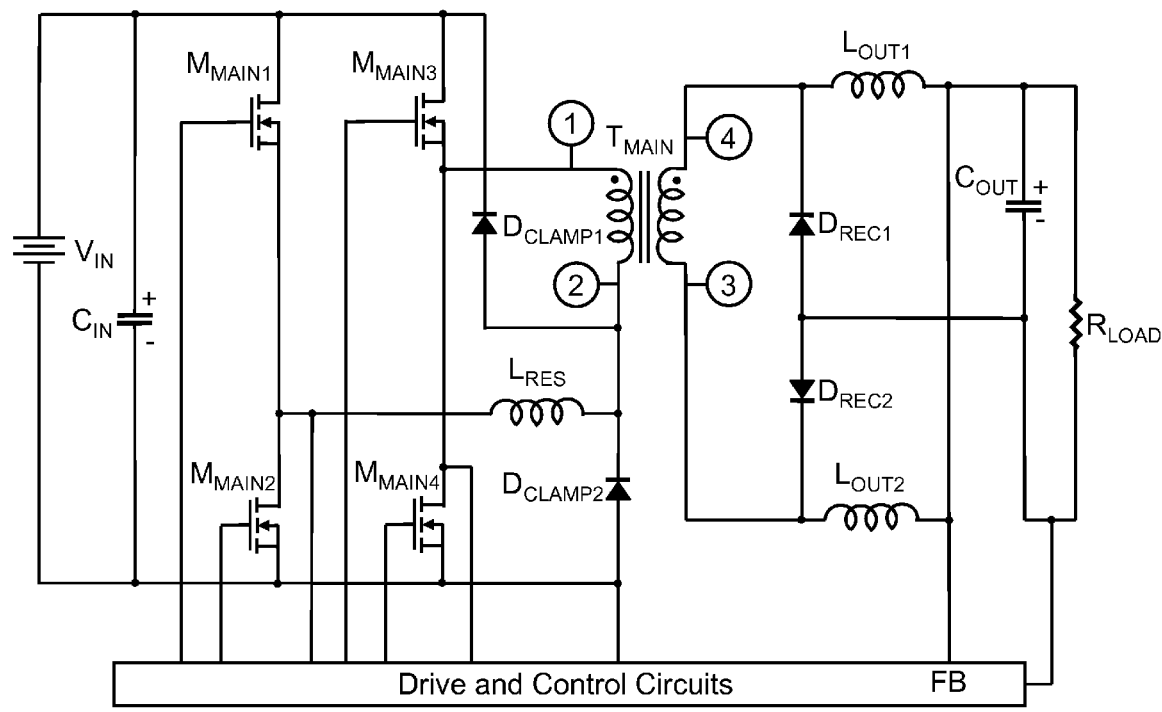
FIG. 27 illustrates a prior art zero voltage switching full bridge current doubler forward converter.

FIG. 27 illustrates a prior art full bridge current doubler forward converter. It achieves zero voltage switching by the use of an inductor $L_{RES}$ connected in series with the primary winding of the transformer $T_{MAIN}$. The primary circuit also includes two clamp rectifiers, $D_{CLAMP1}$ and $D_{CLAMP2}$, for clamping ringing associated with the series inductor $L_{RES}$ and the intrinsic parasitic capacitances of the secondary side rectifiers, $D_{REC1}$ and $D_{REC2}$. The operation of the switching cycle includes two on states and two off states as described above in the FIG. 25 description.

Figure 28:
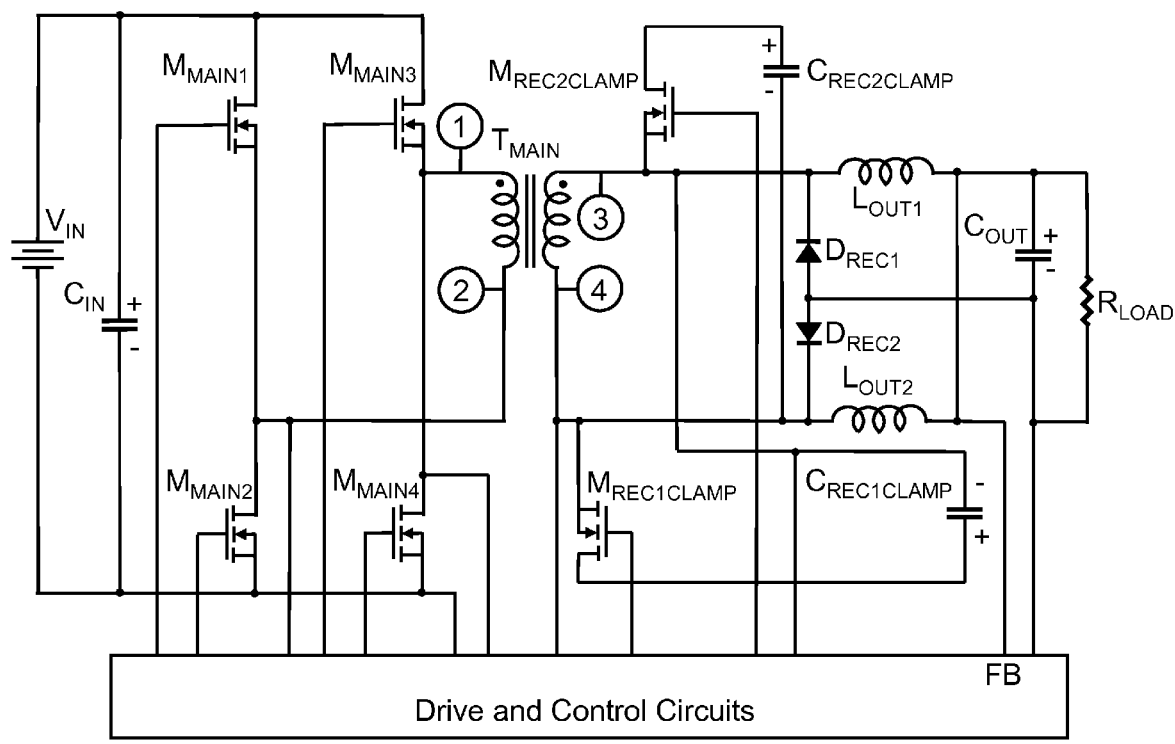
FIG. 28 illustrates a zero voltage switching fully clamped full bridge current doubler forward converter according to the subject invention.

FIG. 28 illustrates an embodiment of the subject invention wherein the improvement of the subject invention is applied to the FIG. 27 circuit. The FIG. 28 circuit eliminates the primary side inductor $L_{RES}$ and the two clamp rectifiers, $D_{CLAMP1}$ and $D_{CLAMP2}$. The FIG. 28 circuit increases the leakage inductance of the transformer $T_{MAIN}$ and adds two active clamp networks to fully clamp $T_{MAIN}$. During a first on state of the FIG. 28 circuit, switches $M_{MAIN1}$, $M_{MAIN4}$, and $M_{REC1CLAMP}$ and rectifier $D_{REC1}$ are on. During the first on state the primary winding of $T_{MAIN}$ is clamped through $M_{MAIN1}$ and $M_{MAIN4}$ by $C_{IN}$. During the first on state the secondary winding of $T_{MAIN}$ is clamped through $M_{REC1CLAMP}$ by $C_{REC1CLAMP}$. During a second on state switches $M_{MAIN2}$, $M_{MAIN3}$, and $M_{REC2CLAMP}$ and rectifier $D_{REC2}$ are on. During the second on state the primary winding of $T_{MAIN}$ is clamped through $M_{MAIN2}$ and $M_{MAIN3}$ by $C_{IN}$. During the second on state the secondary winding of $T_{MAIN}$ is clamped through $M_{REC2CLAMP}$ by $C_{REC2CLAMP}$. During an off state the primary winding of $T_{MAIN}$ is shorted to zero volts by a pair of primary side switches. The pair of primary side switches that are on during the off state is either the pair comprising $M_{MAIN1}$ and $M_{MAIN3}$ or the pair comprising $M_{MAIN2}$ and $M_{MAIN4}$. During the off state the stored energy in the output chokes forces $D_{REC1}$ and $D_{REC2}$ on, so that the secondary winding is clamped to zero applied volts through $D_{REC1}$ and $D_{REC2}$. The added clamp networks clamp the secondary windings during the on states of the circuit. $T_{MAIN}$ is clamped during the off states by the switches and rectifiers already provided in the prior art circuit. The FIG. 28 circuit uses the leakage inductance of the transformer $T_{MAIN}$ to drive zero voltage turn on transitions of the primary switches without any adverse effects of the leakage inductance.

Figure 29:
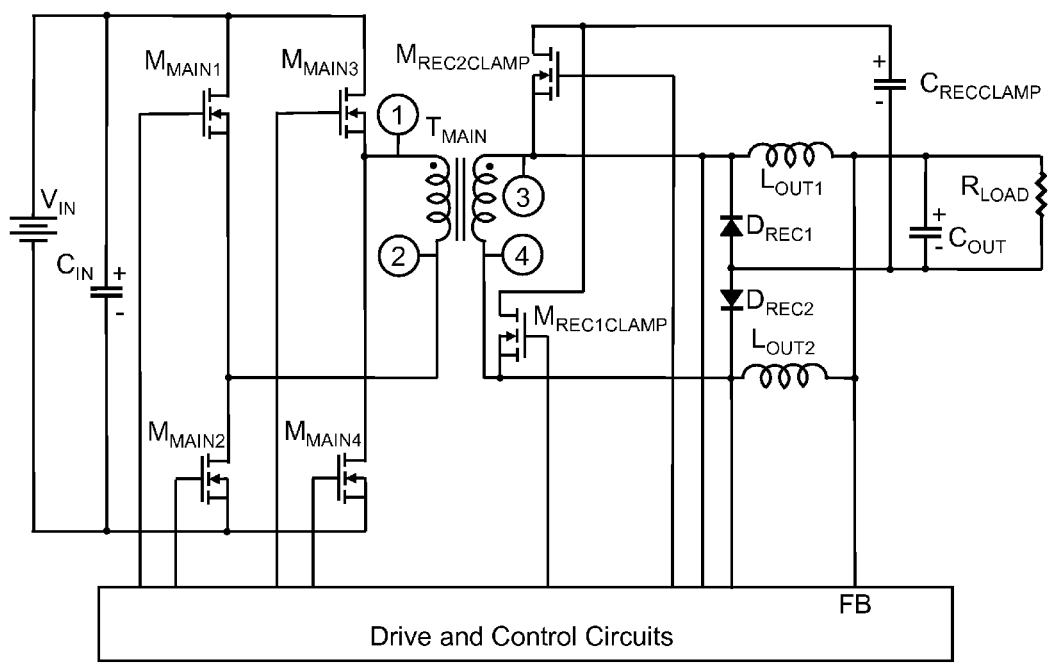
FIG. 29 illustrates a zero voltage switching fully clamped full bridge current doubler forward converter with a shared secondary clamp capacitor according to the subject invention.

FIG. 29 is an embodiment of the subject invention similar to the FIG. 28 circuit wherein the two added active clamp networks share a common capacitor in the FIG. 29 circuit. The sharing of the capacitor is possible due to the circuit's symmetry wherein the two capacitors of the FIG. 28 circuit have the same applied voltage for all operating conditions. During a first on state the secondary winding of $T_{MAIN}$ is clamped through $M_{REC1CLAMP}$ and $D_{REC1}$ by $C_{RECCLAMP}$. In a second on state the secondary winding of $T_{MAIN}$ is clamped through $M_{REC2CLAMP}$ and $D_{REC2}$ by $C_{RECCLAMP}$. In the FIG. 29 circuit the clamp capacitor $C_{RECCLAMP}$ is connected to the secondary winding through one of the secondary circuit rectifiers in addition to being connected to the winding through the switches, $M_{REC1CLAMP}$ and $M_{REC2CLAMP}$, but this more complex connection enables the elimination of one of the clamp capacitors.

Figure 30:
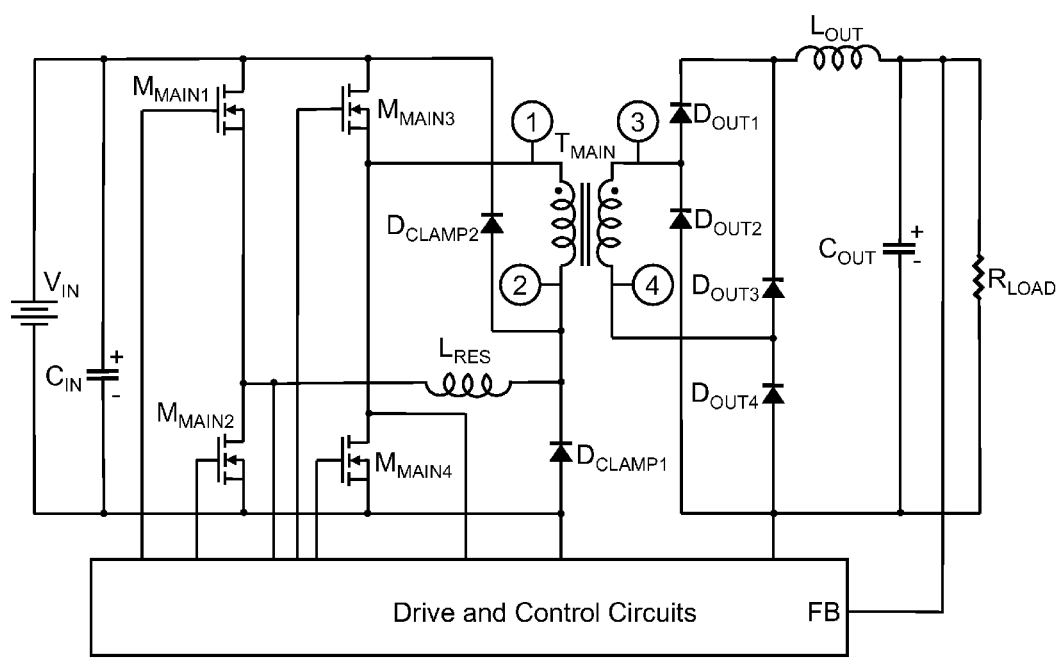
FIG. 30 illustrates a prior art zero voltage switching full bridge forward converter with a full bridge secondary rectifier.

FIG. 30 is a prior art zero voltage switching full bridge forward converter with a full bridge secondary circuit. An inductor $L_{RES}$ provides energy to drive zero voltage turn on transitions for the primary switches. Rectifiers $D_{CLAMP1}$ and $D_{CLAMP2}$ provide clamps to prevent ringing.

Figure 31:
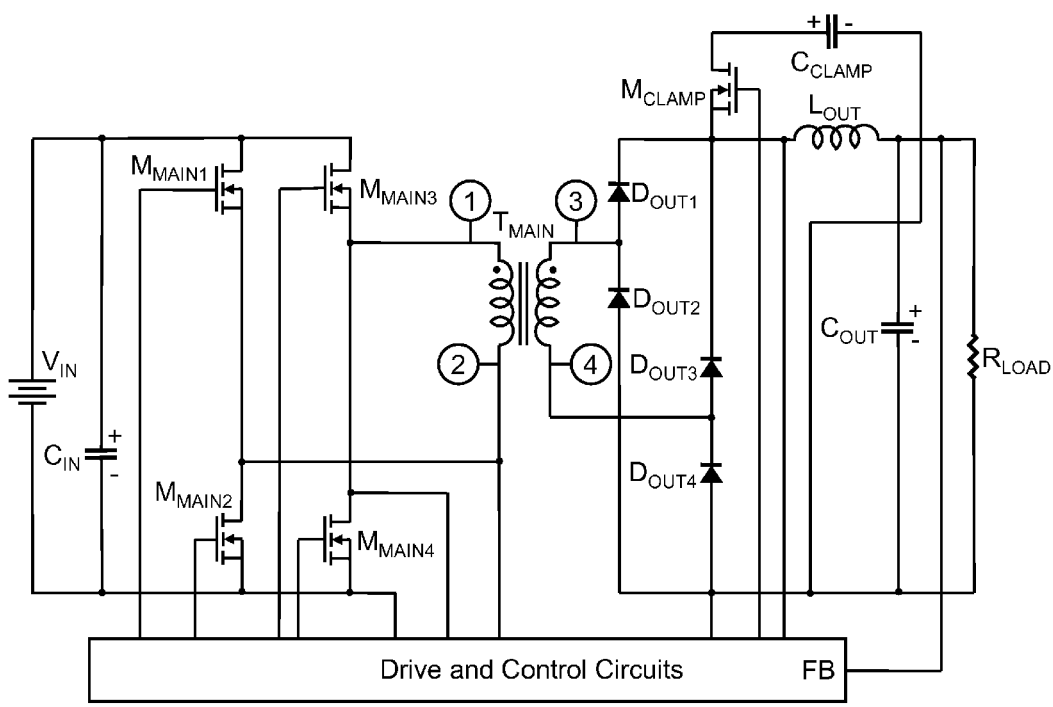
FIG. 31 illustrates a zero voltage switching fully clamped full bridge forward converter with a shared active clamp network according to the subject invention.

FIG. 31 is an embodiment of the subject invention wherein the improvements of the subject invention are applied to the FIG. 30 circuit. In the FIG. 31 circuit the primary side inductor $L_{RES}$ and the two rectifiers, $D_{CLAMP1}$ and $D_{CLAMP2}$, are eliminated. On the secondary side a single combined active clamp network eliminates ringing in both on states. The leakage inductance of $T_{MAIN}$ must be increased in order to achieve zero voltage switching, as described above for the FIG. 28 circuit. With these additions, deletions, and changes the FIG. 30 circuit achieves zero voltage switching and the transformer $T_{MAIN}$ is fully clamped.

Figure 32:
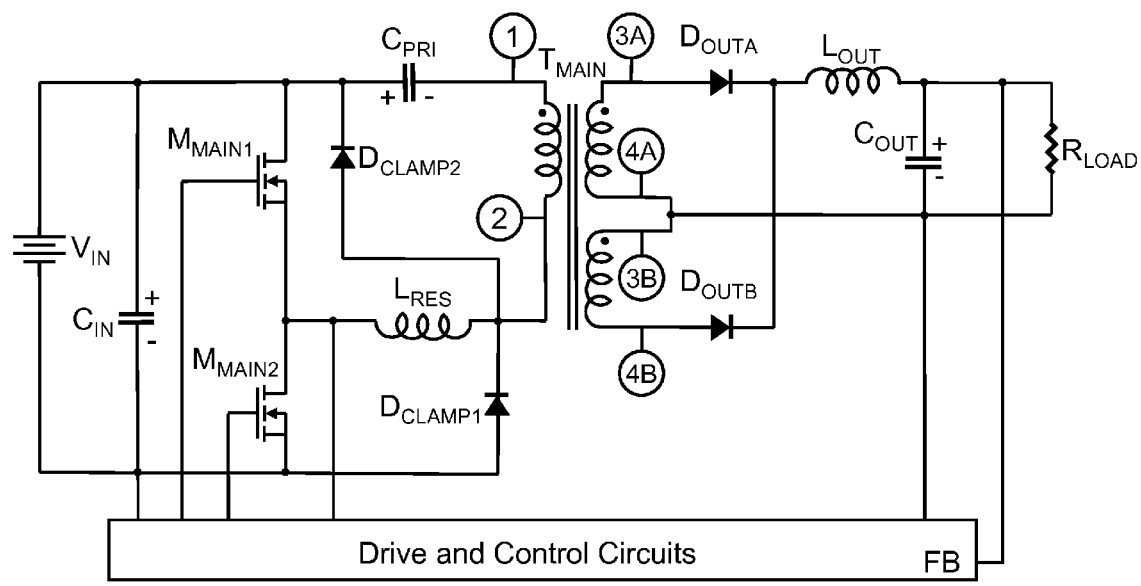
FIG. 32 illustrates a prior art zero voltage switching asymmetrical half bridge forward converter.

FIG. 32 is a prior art zero voltage switching asymmetrical half bridge converter. Its transfer function and performance are similar to the asymmetrical half bridge circuit of FIG. 21. In the FIG. 32 circuit $L_{RES}$ is used to drive zero voltage turn on transitions for the two primary side switches, $M_{MAIN1}$ and $M_{MAIN2}$. The rectifiers $D_{CLAMP1}$ and $D_{CLAMP2}$ clamp ringing associated with $L_{RES}$ and the intrinsic parasitic capacitances of the off rectifiers $D_{OUTA}$ and $D_{OUTB}$.

Figure 33:
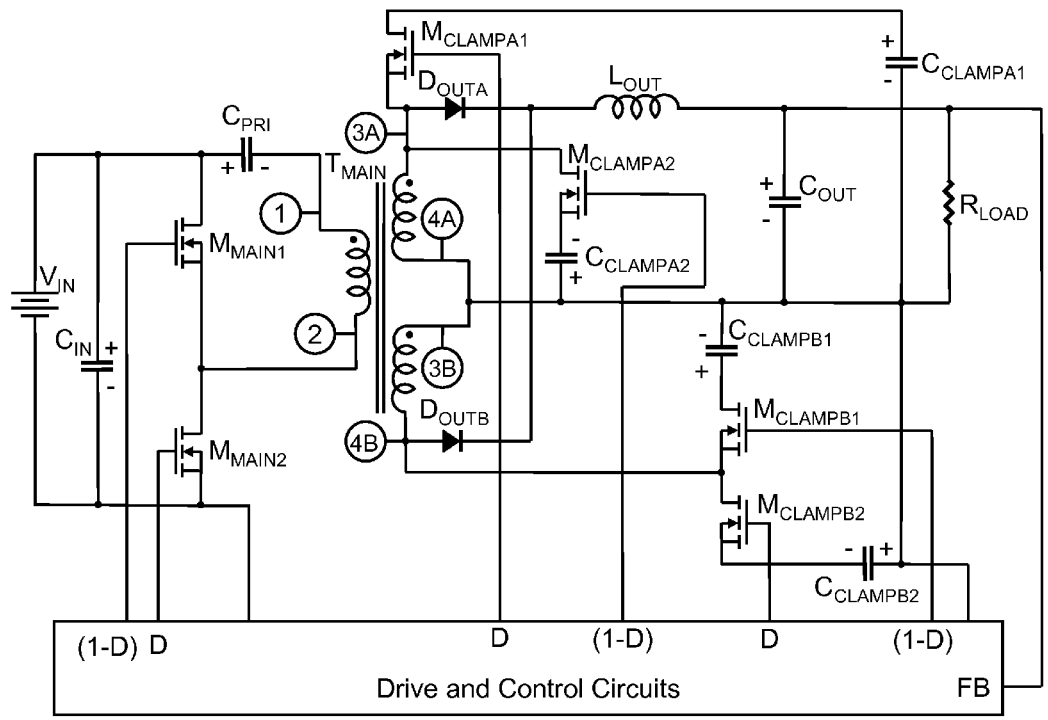
FIG. 33 illustrates a zero voltage switching fully clamped asymmetrical half bridge forward converter according to the subject invention.

FIG. 33 illustrates an embodiment of the subject invention wherein the improvements of the subject invention are applied to the FIG. 32 circuit. In the FIG. 33 circuit the inductor $L_{RES}$ and the rectifiers $D_{CLAMP1}$ and $D_{CLAMP2}$ have been eliminated. In order to provide sufficient drive energy to achieve zero voltage switching the leakage inductance of the transformer $T_{MAIN}$ must be increased. In order to fully clamp the transformer $T_{MAIN}$ four active clamp networks must be added, as illustrated in FIG. 33.

Figure 34:
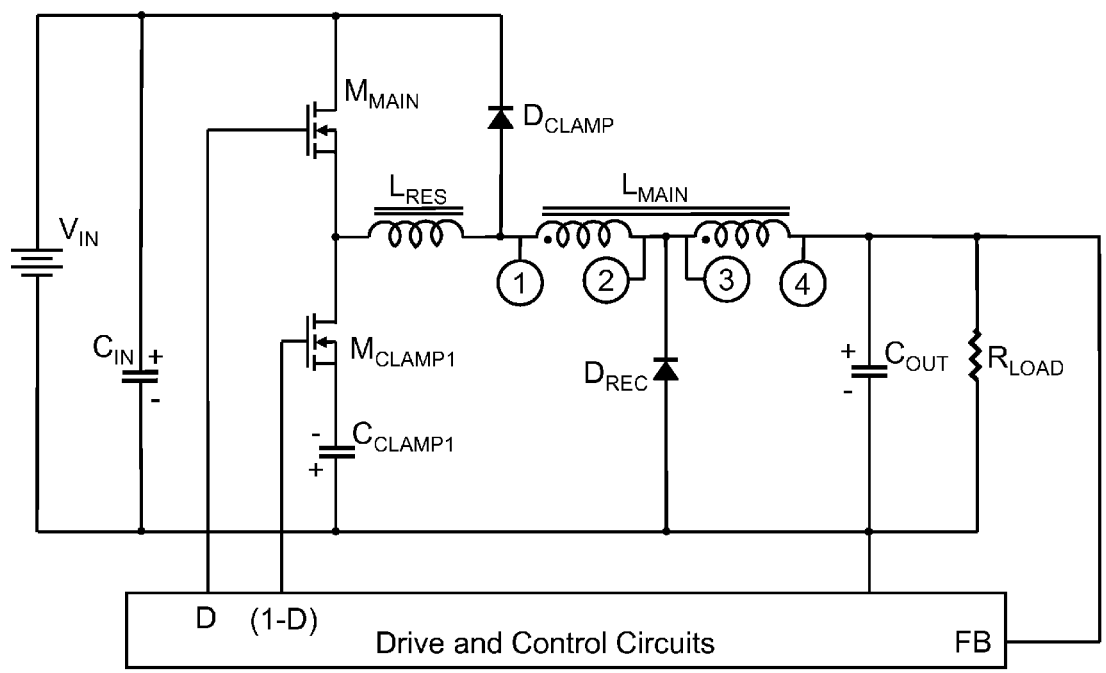
FIG. 34 illustrates a prior art zero voltage switching tapped inductor buck converter.

FIG. 34 illustrates a prior art zero voltage switching tapped inductor buck converter. An inductor $L_{RES}$ is used to provide energy to drive a zero voltage turn on transition for $M_{MAIN}$. $D_{CLAMP}$ is provided to clamp ringing associated with the intrinsic parasitic capacitance of the off rectifier $D_{REC}$ during an on state of the converter.

Figure 35:
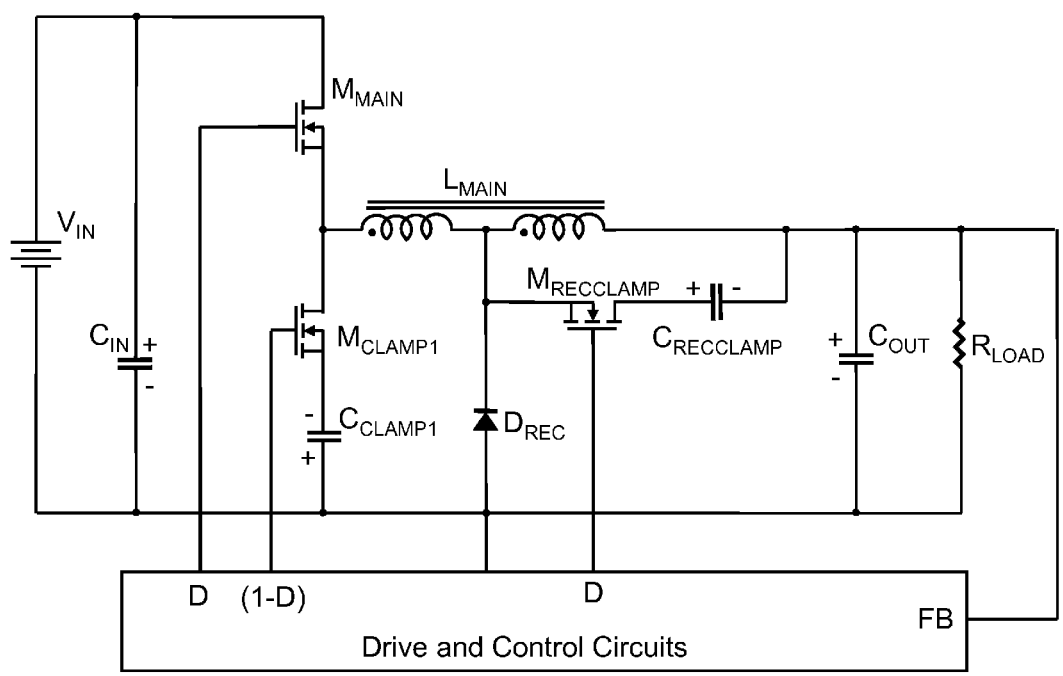
FIG. 35 illustrates a zero voltage switching fully clamped tapped inductor buck converter according to the subject invention.

FIG. 35 illustrates an embodiment of the subject invention wherein the improvements of the subject invention are applied to the FIG. 34 circuit. In the FIG. 35 circuit $L_{RES}$ and $D_{CLAMP}$ are eliminated. In order to maintain zero voltage switching the leakage inductance of $L_{MAIN}$ must be increased to a value equivalent to the inductance of $L_{RES}$. In order to fully clamp $L_{MAIN}$ and eliminate any adverse effects of the added leakage inductance an active clamp network comprising $M_{RECCLAMP}$ and $C_{RECCLAMP}$ must be added. In a related embodiment of the subject invention a variation of the FIG. 35 circuit connects the positive terminal of $C_{CLAMP1}$ to the positive terminal of $C_{IN}$. The altered connection of $C_{CLAMP1}$ provides non-pulsating input terminal current for improved emc.

Figure 36:
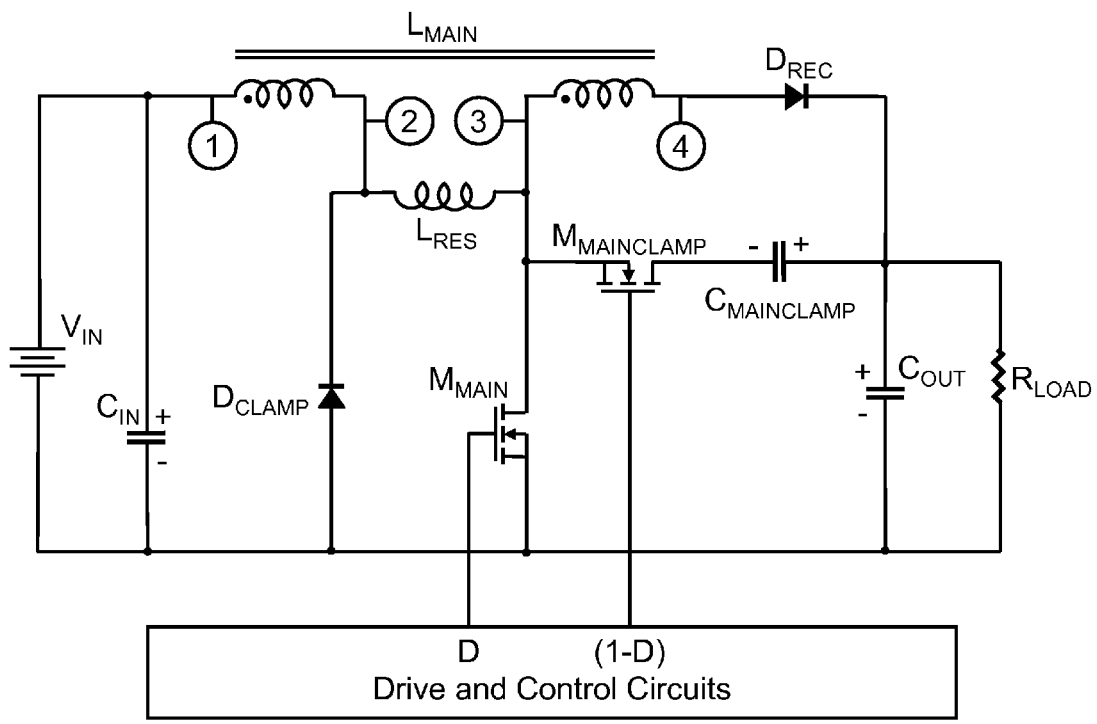
FIG. 36 illustrates a prior art zero voltage switching tapped inductor boost converter.

FIG. 36 illustrates a prior art zero voltage switching tapped inductor boost converter. In the FIG. 36 circuit an inductor LRES provides energy to drive a zero voltage turn on transition of a main switch $M_{MAIN}$. A rectifier $D_{CLAMP}$ clamps ringing that would otherwise occur during an on state of $M_{MAIN}$. An active clamp network comprising $M_{MAINCLAMP}$ and $C_{MAINCLAMP}$ clamps ringing that would otherwise occur during an off state of $M_{MAIN}$.

Figure 37:
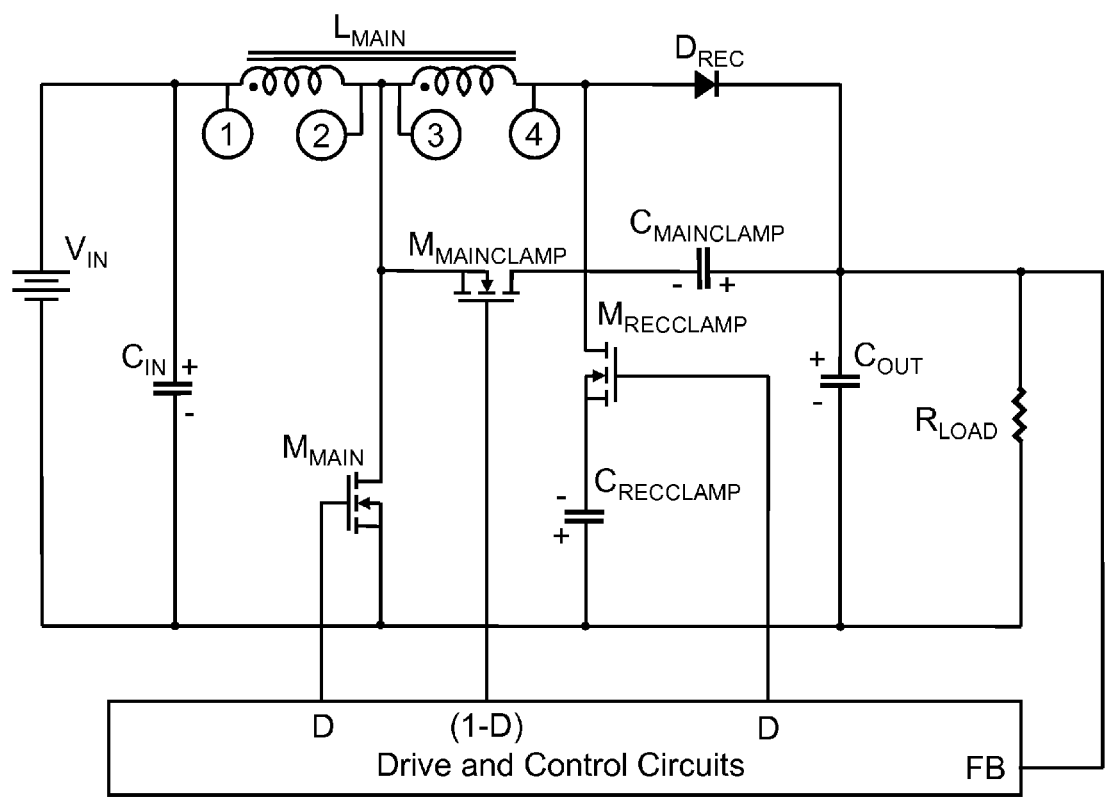
FIG. 37 illustrates a zero voltage switching fully clamped tapped inductor boost converter according to the subject invention.

FIG. 37 illustrates an embodiment of the subject invention wherein the improvements of the subject invention are applied to the circuit of FIG. 36. In the FIG. 37 circuit the inductor $L_{RES}$ and the rectifier $D_{CLAMP}$ have been eliminated. The leakage inductance of $L_{MAIN}$ is increased in order to maintain the zero voltage switching ability and an active clamp network comprising $M_{RECCLAMP}$ and $C_{RECCLAMP}$ is added to eliminate ringing associated with the leakage inductance of $L_{MAIN}$ and the intrinsic parasitic capacitance of the off rectifier $D_{REC}$ during an on state of the circuit. With the added active clamp network the coupled inductor $L_{MAIN}$ is fully clamped.

Figure 38:
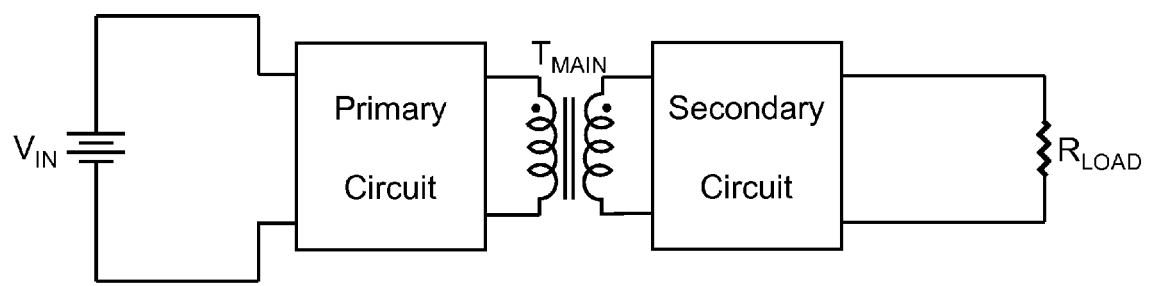
FIG. 38 illustrates a block diagram with isolation transformer of a general isolated power converter.
Figure 39:
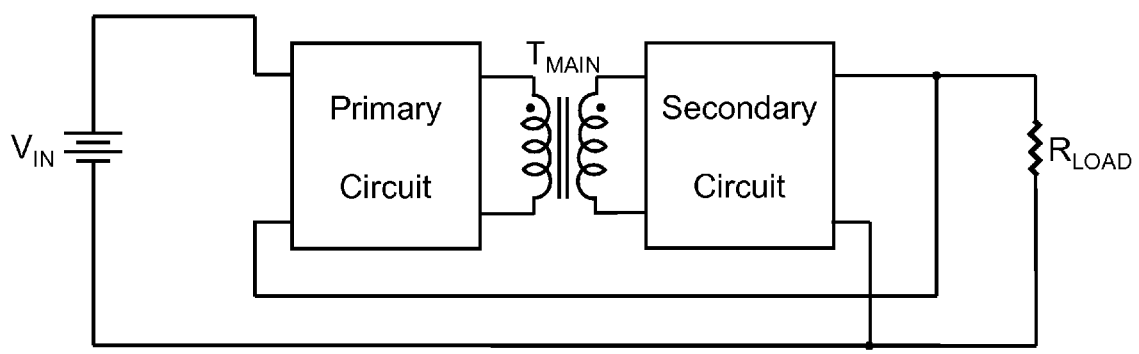
FIG. 39 illustrates how the general isolated power converter of FIG. 38 can be connected to form a non-isolated step down converter.
Figure 40:
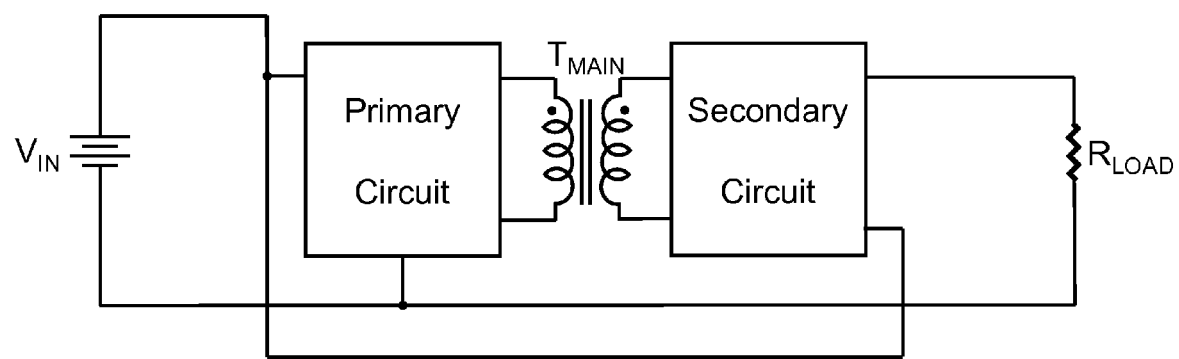
FIG. 40 illustrates how the general isolated power converter of FIG. 38 can be connected to form a non-isolated step up converter.

FIG. 38 illustrates a general power converter structure which describes most of the circuits revealed in this application wherein there exists a primary circuit that is connected to a primary winding of a transformer $T_{MAIN}$ and to an input source of power $V_{IN}$ and a secondary circuit which is connected to a secondary winding of $T_{MAIN}$ and to a load $R_{LOAD}$. The general power converter structure of FIG. 38 can be arranged to form non-isolated step down and step up converters, as illustrated in FIGS. 39 and 40, respectively. The non-isolated circuit structures illustrated in FIGS. 39 and 40 should be considered embodiments of the subject invention where the improvements of the subject invention have been applied to the isolated circuits on which the non-isolated circuits are based.

Figure 42:
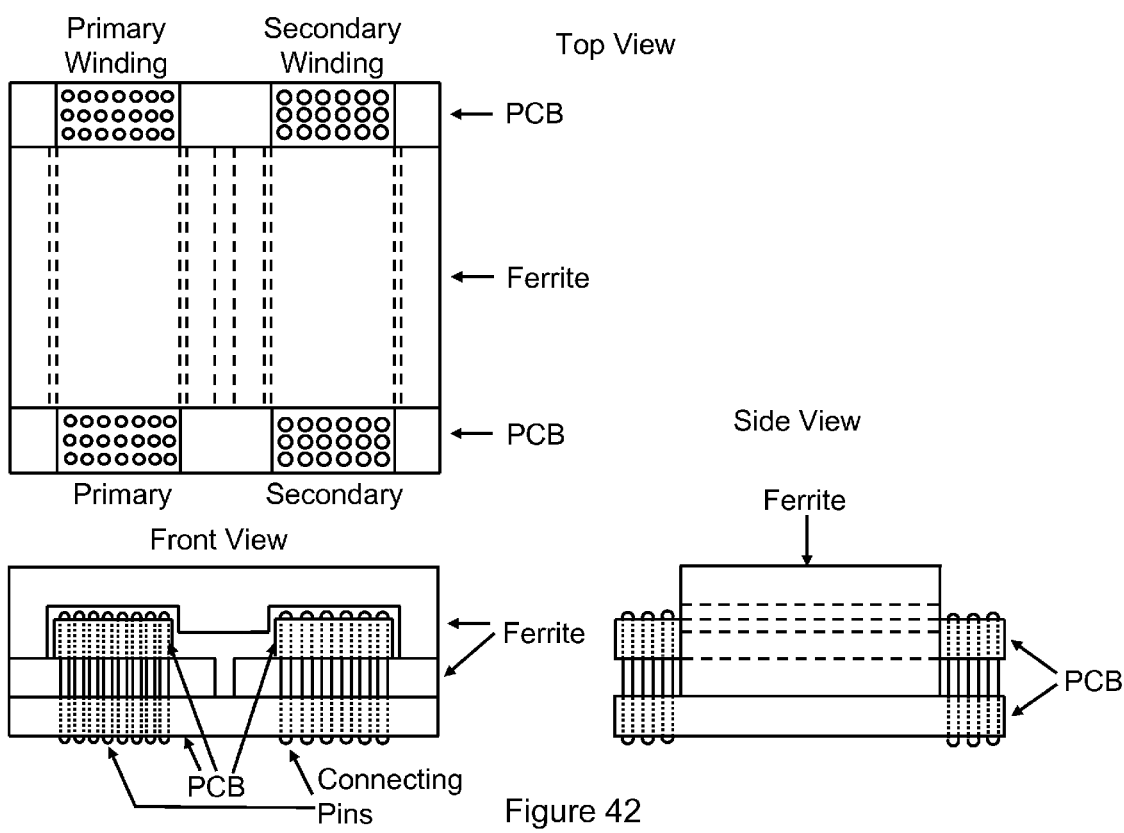
FIG. 42 illustrates a ferrite EI core planar four layer magnetics construction that can be used to form coupled magnetic circuit elements with relatively large leakage inductance, as needed for zero voltage switching fully clamped power converters.

FIG. 42 illustrates a four layer planar magnetic structure using a planar ferrite EI core. In the magnetic circuit element illustrated in FIG. 42 the outer ferrite loop of the EI core couples the primary and secondary windings and a separate gap exists in the outer ferrite loop, at the center of the I core piece, as illustrated, for storing energy in the coupled inductor where energy storage in the coupled inductor is necessary. Alternatively, the outer leg gap can be accomplished by using a spacer in each outer leg. The center post of the E core is used only as a magnetic path for leakage flux. A relatively large gap is placed in the center post of the E core for adjusting and controlling the value of leakage inductance. Energy stored in the center post gap would be responsible for storing the energy needed to drive a zero voltage switching transition. The magnetic flux paths are separated so that magnetizing flux exists in the outer loop and leakage flux exists in both the center post and the outer loop. The four layer planar magnetic structure comprises four vertical layers having two ferrite layers and two winding layers wherein winding layers are interleaved with ferrite layers. An example of a similar prior art four layer planar magnetic structure is illustrated in U.S. Pat. No. 6,114,939. The structure illustrated in FIG. 42 differs from the previously patented structure in that the FIG. 42 structure adds a ferrite center post for a leakage inductance flux path and separates primary windings and secondary windings by the center post. The windings are formed by printed circuit board (PCB) traces and conducting pins connecting the two PCB layers in FIG. 42, wherein half of each winding turn exists on a lower winding layer and the other half of each winding turn is completed on an upper winding layer. The upper and lower winding layers are electrically connected by conducting pins to complete each winding turn. Most commercial planar magnetic circuit elements are three layer structures with two ferrite layers and a PCB layer containing spiral windings that extend beyond the center post of the ferrite core. In some applications the ferrite layers extend both above and below the main printed circuit board and the spiral windings are placed in the main printed circuit board that also contains the circuit elements and connections for the rest of the power supply circuit. The three layer structures usually connect to a main printed circuit board that is not a part of the magnetic structure. In the subject four layer structure a main printed circuit board that also contains power supply circuits and circuit elements may be used as the bottom winding layer in the four layer structure so that there is no height penalty for the four layer structure in comparison to the most commonly used three layer structures. The FIG. 42 structure is just one example of a magnetic structure that would be suitable for use as a coupled inductor with enhanced leakage inductance.

CONCLUSION, RAMIFICATIONS, AND SCOPE OF INVENTION

Thus the reader will see that addition of active clamp networks, placed as indicated herein, can totally eliminate overshoot and ringing associated with leakage inductance and fully clamp a coupled inductor. By achieving a means of fully clamping a coupled inductor the leakage inductance of the coupled inductor can be used beneficially to provide stored energy for driving zero voltage turn on switching transitions for the main switch or for main switches of a power supply circuit. Additionally, circuits that comprise a series inductor for driving a zero voltage switching transition can eliminate the series inductor and instead use leakage inductance in the coupled inductor to drive the zero voltage switching transition without the adverse effects of overshoot and ringing associated with leakage inductance. A magnetic structure suitable for use as a coupled inductor with enhanced leakage inductance is revealed.

While my above description contains many specificities, these should not be construed as limitations on the scope of the invention, but rather, as exemplifications or preferred embodiments thereof. Many other variations are possible. For example, in most of the circuits illustrated one can find alternate workable connections of the active clamp networks that accomplish full clamping of the same winding in the same operating state as the active clamp network illustrated in the figures of this application, but these too should be considered embodiments of the subject invention. In other cases where two active clamp networks are illustrated in the figures, a single active clamp network providing the same clamping action as the two active clamp networks illustrated may be possible or active clamp networks that share a common capacitor or a common switch may be possible and all of these shall be considered embodiments of the subject invention if they are used to provide full clamping of the coupled inductor. Circuits similar to the circuits shown but with polarity of the input or output reversed from that illustrated in the figures shall be considered embodiments of the subject invention. Circuits similar to those shown, but having coupled inductors with more than two windings and circuits with more than one output shall be considered embodiments of the subject invention. In many of the circuits shown there are series connected networks. The order of placement of circuit elements in series connected networks is inconsequential in the illustrations shown so that series networks in the illustrated circuits with circuit elements reversed or placed in an entirely different order within series connected networks are equivalent to the circuits illustrated and shall be considered embodiments of the subject invention. Also, most of the circuits illustrated include rectifiers in the form of junction rectifiers, but in every case a schottky rectifier or synchronous rectifier may be substituted for the junction rectifier included in the illustration and these new circuits with schottky rectifiers or synchronous rectifiers substituted for the junction rectifiers included in the illustrations shall be considered embodiments of the subject invention. Also, most of the embodiments illustrated show switches implemented with N channel mosfets, but the operation revealed and the benefits achieved in the subject invention can also be realized in circuits that implement switches using P channel mosfets, IGBTs, or bipolar transistors, which should be considered embodiments of the subject invention. Also, new non-isolated converter structures can be formed from the isolated structures revealed in this application by adding a connection between the primary circuit and the secondary circuit of the isolated structure and these too should be considered embodiments of the subject invention. Also, an enhanced leakage coupled inductor is revealed with stored energy in each of its three legs by using a gap in a center post and a gap in an I core placed near the center post gap, but a core structure with three gaps with one gap in each of the three legs accomplishes the same result and that should be considered an embodiment of the subject invention. Also, the enhanced leakage inductance coupled inductor is illustrated with an EI core, but other core structures having three legs, such as EER cores, ETD cores, EC cores, or RM cores can also be used and should be considered embodiments of the subject invention.

Accordingly, the scope of the invention should be determined not by the embodiments illustrated, but by the appended claims and their legal equivalents.

The invention claimed is:

1. A fully clamped coupled inductor power conversion circuit formed by applying an improvement method to a unclamped coupled inductor power conversion circuit, wherein said unclamped coupled inductor power conversion circuit has at least two operating states, and wherein said unclamped coupled inductor power conversion circuit comprises at least a first coupled inductor having at least a first winding and a second winding, an inductance connected in series with said first coupled inductor, and a first switch means, wherein at least one of said windings of said first coupled inductor is unclamped in at least one of said operating states of said unclamped coupled inductor power conversion circuit, said improvement method comprising the following steps, Step (1): adding an active clamp network such that said active clamp network is coupled to said unclamped winding of said first coupled inductor, said active clamp network comprising, second switch means, wherein said second switch means are placed in a conducting state during said operating state of said unclamped coupled inductor power conversion circuit in which said unclamped winding of said first coupled inductor was unclamped and wherein said second switch means are placed in a non-conducting state during all other operating states, and a capacitor coupled to said unclamped winding of said first coupled inductor through said second switch means during said operating state of said unclamped coupled inductor power conversion circuit in which said unclamped winding of said first coupled inductor was unclamped, Step (2): repeating step (1) for each of said windings and each of said operating states of said unclamped coupled inductor power conversion circuit until all of said windings of said coupled inductor are clamped during all of said operating states, whereby said fully clamped coupled inductor power conversion circuit becomes fully clamped by application of said improvement method to said unclamped coupled inductor power conversion circuit thereby eliminating ringing and over shoot associated with said inductance.

2. The fully clamped coupled inductor power conversion circuit as set forth in claim 1, wherein said switch means comprise semiconductor switch means.

3. The fully clamped coupled inductor power conversion circuit as set forth in claim 2, wherein said semiconductor switch means comprise transistors.

4. The fully clamped coupled inductor power conversion circuit as set forth in claim 3, wherein said transistors comprise mosfets.

5. The fully clamped coupled inductor power conversion circuit as set forth in claim 1, wherein said inductance comprises a leakage inductance inherent to said first coupled inductor.

6. The fully clamped coupled inductor power conversion circuit as set forth in claim 1, wherein said inductance comprises a discrete inductor structurally separated from said first coupled inductor.

7. The fully clamped coupled inductor power conversion circuit as set forth in claim 1, wherein said first switch means is a main switch means and said inductance contributes energy to reduce an output voltage and turn on switching power losses of said first switch means during a turn on switching transition of said first switch means.

8. The fully clamped coupled inductor power conversion circuit as set forth in claim 1 formed by adding two of said active clamp networks wherein the dc terminal voltages of said capacitors of said active clamp networks are substantially identical.

9. The fully clamped coupled inductor power conversion circuit as set forth in claim 8, wherein said capacitors of said active clamp networks are combined in a single common capacitor.

10. The fully clamped coupled inductor power conversion circuit as set forth in claim 1, further comprising additional windings coupled to said first coupled inductor, wherein said improvement method is applied to all of said additional windings during all of said operational states such that all of said windings of said first coupled inductor are clamped during all of said operating states.

11. A fully clamped coupled inductor power conversion circuit formed by applying an improvement method to a unclamped coupled inductor power conversion circuit, wherein said unclamped coupled inductor power conversion circuit has at least two operating states, and wherein said unclamped coupled inductor power conversion circuit comprises at least a first coupled inductor having at least a first winding and a second winding, a first inductance connected in series with said first coupled inductor, a second coupled inductor having at least a first winding and a second winding, wherein said first winding of said first coupled inductor and said first winding of said second coupled inductor are connected in a series combination, a second inductance connected in series with said second coupled inductor, and first switch means, wherein said series combination of said first winding of said first coupled inductor and said first winding of said second coupled inductor is unclamped in one of said operating states of said unclamped coupled inductor power conversion circuit, said improvement method comprising the following steps, Step (1): adding an active clamp network such that said active clamp network is coupled to said unclamped series combination of said first winding of said first coupled inductor and said first winding of said second coupled inductor, said active clamp network comprising, second switch means, wherein said second switch means are placed in a conducting state during said operating state of said unclamped coupled inductor power conversion circuit in which said unclamped series combination of said first winding of said first coupled inductor and said first winding of said second coupled inductor was unclamped and wherein said second switch means are placed in a non-conducting state during all other operating states, and a capacitor coupled to said unclamped series combination of said first winding of said first coupled inductor and said first winding of said second coupled inductor through said second switch means during said operating state of said unclamped coupled inductor power conversion circuit in which said unclamped series combination of said first winding of said first coupled inductor and said first winding of said second coupled inductor was unclamped, Step (2): repeating step (1) for each of said operating states of said unclamped coupled inductor power conversion circuit until said series combination of said first winding of said first coupled inductor and said first winding of said second coupled inductor is clamped during all of said operating states, Step (3): adding an active clamp network such that said active clamp network is coupled to an unclamped second winding of said first coupled inductor, if there exists an unclamped second winding of said first coupled inductor, or coupled to an unclamped second winding of said second coupled inductor, if there exists an unclamped second winding of said second coupled inductor, said active clamp network comprising, third switch means, wherein said third switch means are placed in a conducting state during said operating state of said unclamped coupled inductor power conversion circuit in which said unclamped second winding was unclamped and wherein said third switch means are placed in a non-conducting state during all other operating states, and a capacitor coupled to said unclamped second winding through said third switch means during said operating state of said unclamped coupled inductor power conversion circuit in which said unclamped second winding was unclamped, Step (4): repeating step (3) for each of said second windings and each of said operating states of said unclamped coupled inductor power conversion circuit until all of said second windings are clamped during all of said operating states, whereby said fully clamped coupled inductor power conversion circuit becomes fully clamped by application of said improvement method to said unclamped coupled inductor power conversion circuit thereby eliminating ringing and over shoot associated with said inductances.

12. The fully clamped coupled inductor power conversion circuit as set forth in claim 11, further comprising additional windings coupled to said first coupled inductor, wherein said improvement method is applied to all of said additional windings during all of said operational states such that all of said windings of said first coupled inductor are clamped during all of said operating states.

13. The fully clamped coupled inductor power conversion circuit as set forth in claim 11, further comprising additional windings coupled to said second coupled inductor, wherein said improvement method is applied to all of said additional windings during all of said operational states such that all of said windings of said second coupled inductor are clamped during all of said operating states.

14. The fully clamped coupled inductor power conversion circuit as set forth in claim 11, further comprising additional windings coupled to said first and second coupled inductors, wherein said improvement method is applied to all of said additional windings during all of said operational states such that all of said windings of said first and second coupled inductors are clamped during all of said operating states.

15. The fully clamped coupled inductor power conversion circuit as set forth in claim 11, wherein said switch means comprise semiconductor switch means.

16. The fully clamped coupled inductor power conversion circuit as set forth in claim 15, wherein said semiconductor switch means comprise transistors.

17. The fully clamped coupled inductor power conversion circuit as set forth in claim 16, wherein said transistors comprise mosfets.

18. The fully clamped coupled inductor power conversion circuit as set forth in claim 11, wherein said first switch means is a main switch means and said inductances contribute energy to reduce an output voltage and turn on switching power losses of said first switch means during a turn on switching transition of said first switch means.

19. The fully clamped coupled inductor power conversion circuit as set forth in claim 11, wherein said inductances comprise leakage inductances inherent to said coupled inductors.

20. The fully clamped coupled inductor power conversion circuit as set forth in claim 11, wherein said inductances comprises discrete inductors structurally separated from said coupled inductors.

* * * * *